United States Patent [19]
Zelitt

[11] Patent Number: 5,790,086
[45] Date of Patent: Aug. 4, 1998

[54] 3-D IMAGING SYSTEM

[75] Inventor: Sheldon S. Zelitt, North Gower, Canada

[73] Assignee: Visualabs Inc., Calgary, Canada

[21] Appl. No.: 368,644

[22] Filed: Jan. 4, 1995

[51] Int. Cl.$^6$ .................................. G09G 3/20
[52] U.S. Cl. .................... 345/32; 345/6; 349/15; 349/95; 348/42; 348/51
[58] Field of Search .................... 345/32, 6, 7, 76, 345/87, 133; 348/42, 47, 48, 52, 51; 359/62, 94, 458, 462, 463; 349/15, 95

[56] References Cited

U.S. PATENT DOCUMENTS

| | | | |
|---|---|---|---|
| 2,961,486 | 11/1960 | Marks | 178/6.5 |
| 2,983,835 | 5/1961 | Frey, Jr. | 313/89 |
| 3,555,349 | 1/1971 | Munz | 315/21 |
| 3,674,921 | 7/1972 | Goldsmith | 178/5.4 R |
| 3,712,727 | 1/1973 | Bonnet | 355/22 |
| 3,878,329 | 4/1975 | Brown | 178/7.85 |
| 4,541,007 | 9/1985 | Nagata | 358/3 |
| 4,571,041 | 2/1986 | Gaudyn | 353/10 |
| 4,573,191 | 2/1986 | Kidode et al. | 359/462 |
| 4,584,604 | 4/1986 | Guichard et al. | 358/92 |
| 4,729,017 | 3/1988 | Sayanagi et al. | 358/88 |
| 4,743,965 | 5/1988 | Yamada et al. | 358/88 |
| 4,810,056 | 3/1989 | Migozzi et al. | 350/131 |
| 4,829,365 | 5/1989 | Eichenlaub | 358/3 |
| 4,878,735 | 11/1989 | Vilums | 359/462 |
| 4,957,351 | 9/1990 | Shioji | 350/348 |
| 4,992,780 | 2/1991 | Penna et al. | 340/729 |
| 4,992,870 | 2/1991 | Samad | 358/140 |
| 5,005,117 | 4/1991 | Ikumi | 364/200 |
| 5,014,126 | 5/1991 | Pritchard et al. | 358/91 |
| 5,132,839 | 7/1992 | Travis | 359/462 |
| 5,159,663 | 10/1992 | Wake | 395/122 |
| 5,175,805 | 12/1992 | Carrie | 395/122 |
| 5,202,793 | 4/1993 | Auge | 359/463 |
| 5,220,452 | 6/1993 | Anderson | 359/462 |
| 5,279,912 | 1/1994 | Telfer et al. | 430/17 |
| 5,293,467 | 3/1994 | Buchner et al. | 395/122 |
| 5,363,241 | 11/1994 | Hegg et al. | 359/462 |
| 5,475,419 | 12/1995 | Carbery | 348/51 |
| 5,512,344 | 4/1996 | Neal et al. | 359/462 |
| 5,543,964 | 8/1996 | Taylor et al. | 359/463 |
| 5,562,882 | 10/1996 | Takanashi et al. | 345/32 |
| 5,614,941 | 3/1997 | Hines | 348/51 |

FOREIGN PATENT DOCUMENTS

| | | |
|---|---|---|
| 0 204 006 A1 | 12/1986 | European Pat. Off. . |
| 0 267 000 A2 | 5/1988 | European Pat. Off. . |
| 0 502 511 A2 | 9/1992 | European Pat. Off. . |
| 41 10 951 A1 | 10/1992 | Germany . |
| 850217630 | 4/1987 | Japan . |
| 910290667 | 4/1993 | Japan . |
| 910290953 | 4/1993 | Japan . |
| 930310740 | 3/1995 | Japan . |
| WO 88 04804 | 6/1988 | WIPO . |
| WO9321673 | 10/1993 | WIPO . |

*Primary Examiner*—Richard Hjerpe
*Assistant Examiner*—M. Fatahiyar
*Attorney, Agent, or Firm*—Foley & Lardner

[57] ABSTRACT

A 3-dimensional image is obtained from a 2-dimensional display by varying the apparent distance of the image from the viewer on a pixel by pixel basis. This is done by positioning an array of pixel-level optical elements in alignment with the pixels in the image. In a preferred format, each of the optical elements is generally elongate and has a focal length which varies along its length with the result that the point along its length at which light enters the optical element determines the apparent visual distance of the associated pixel from the viewer. In the case of a cathode-ray tube application, controlling the position of entry of the light is done by controlling the electron beam to move a minute distance vertically as it scans horizontally. In a television application, the vertical distance may be determined by a depth component incorporated in the broadcast signal received by a television set. Applications and embodiments relating to computer monitors, film and still printed imagery are also described.

17 Claims, 21 Drawing Sheets

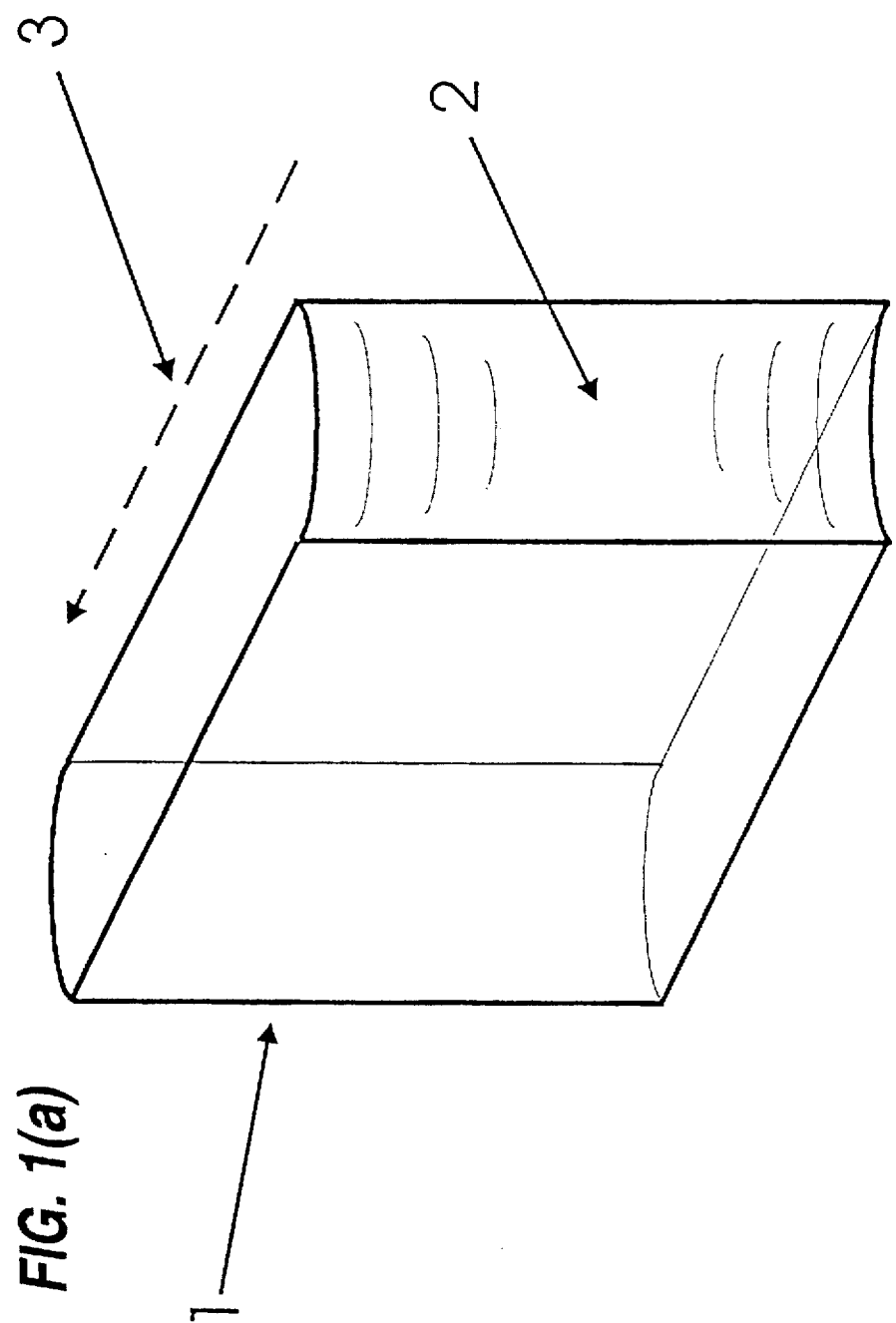

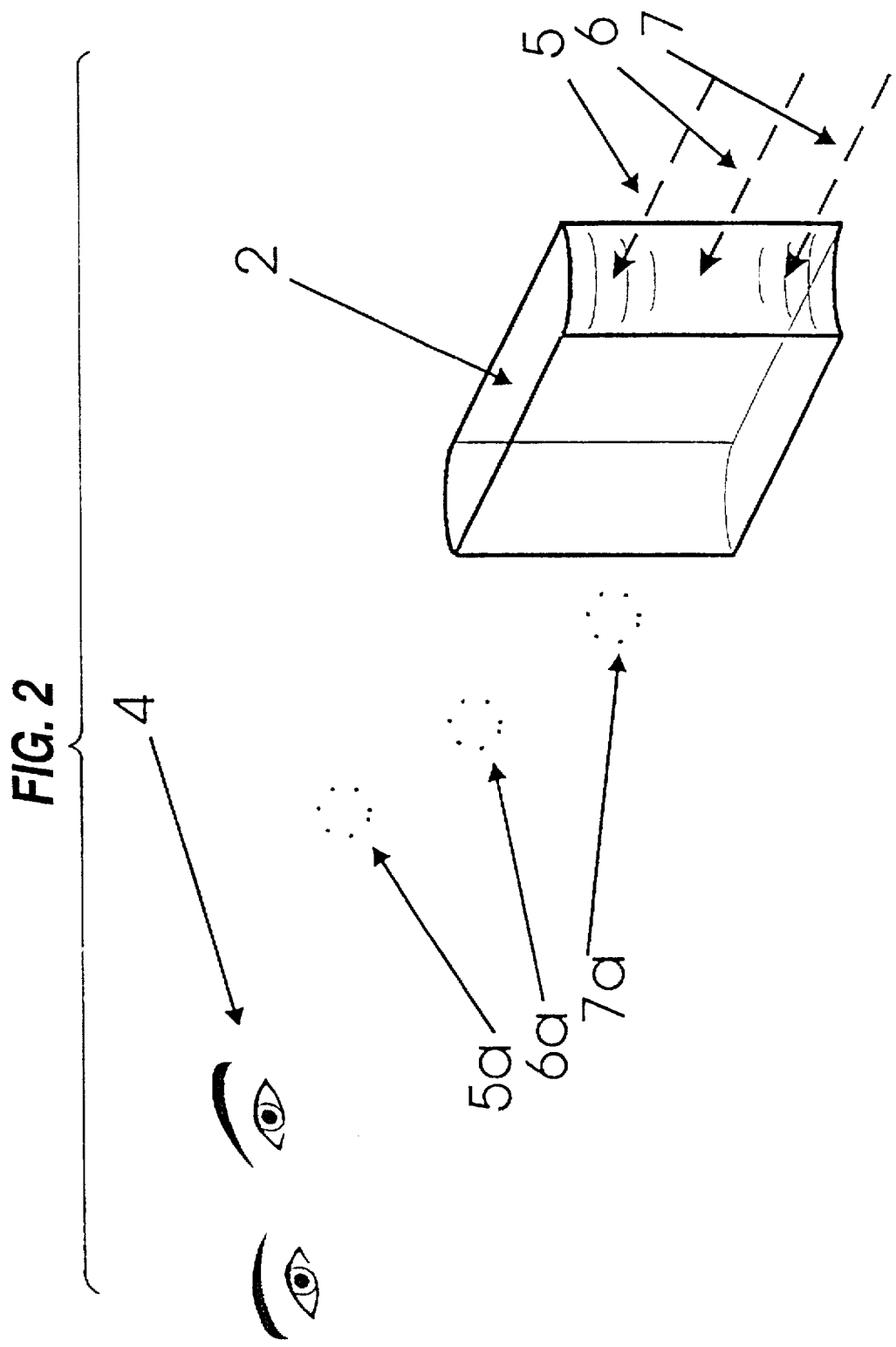

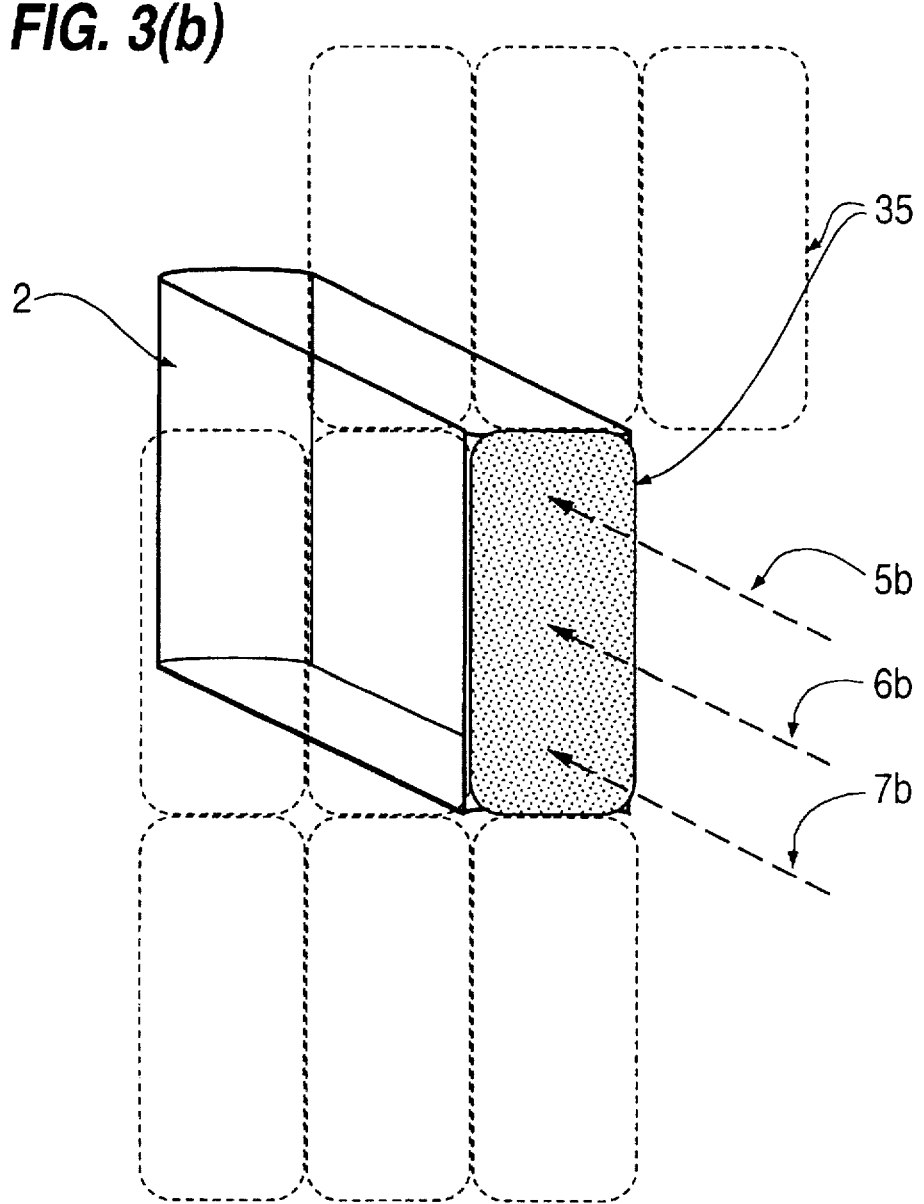

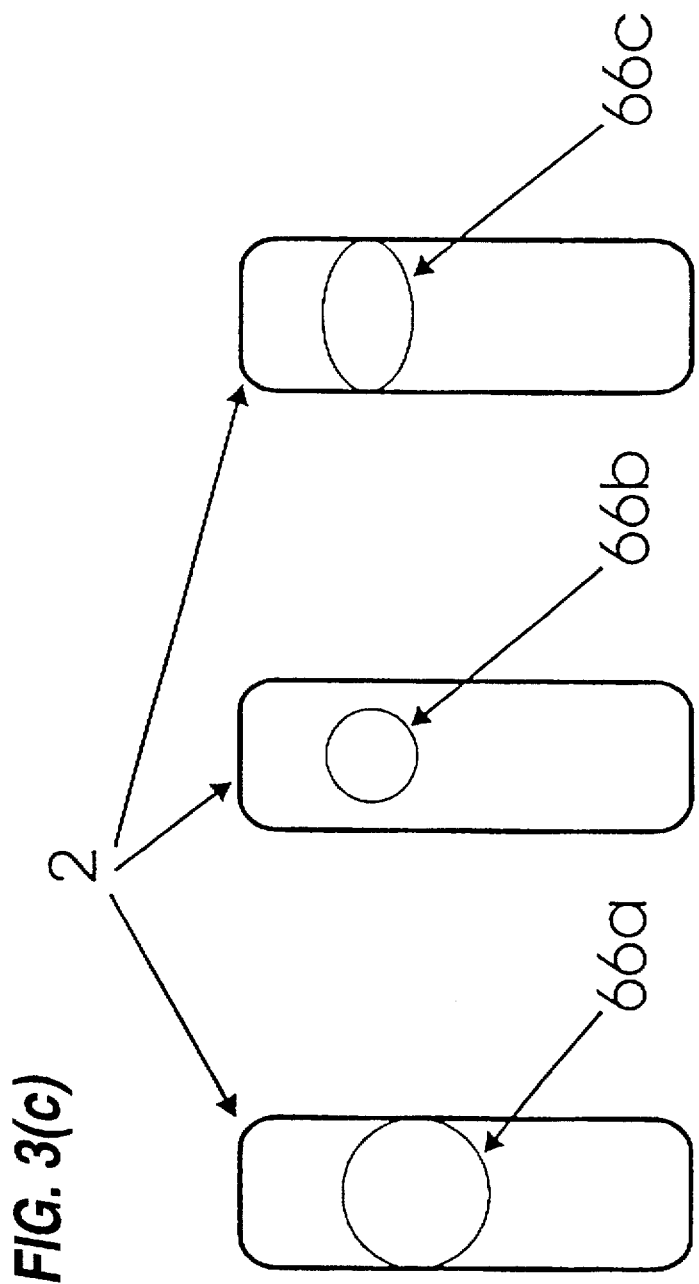

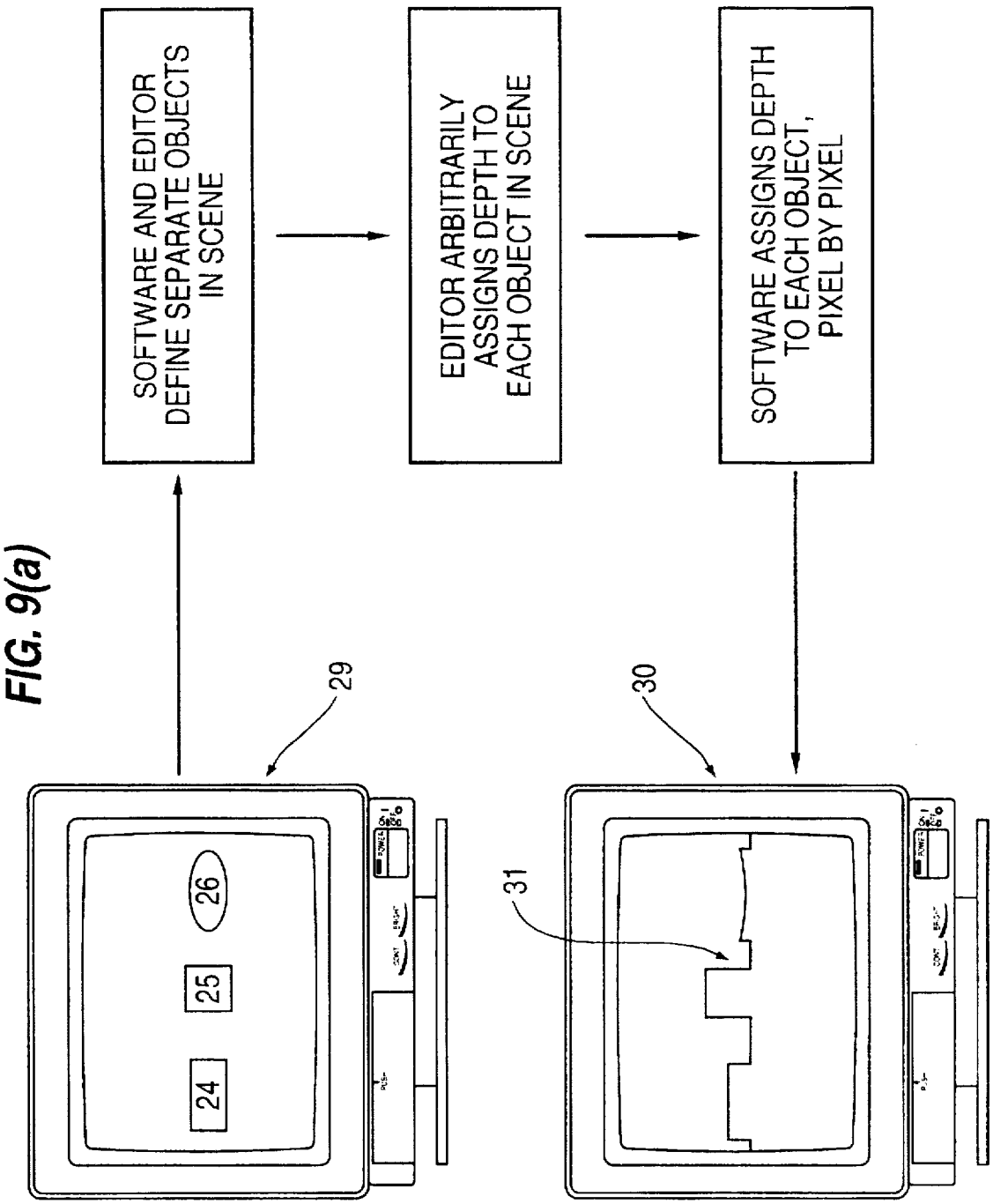

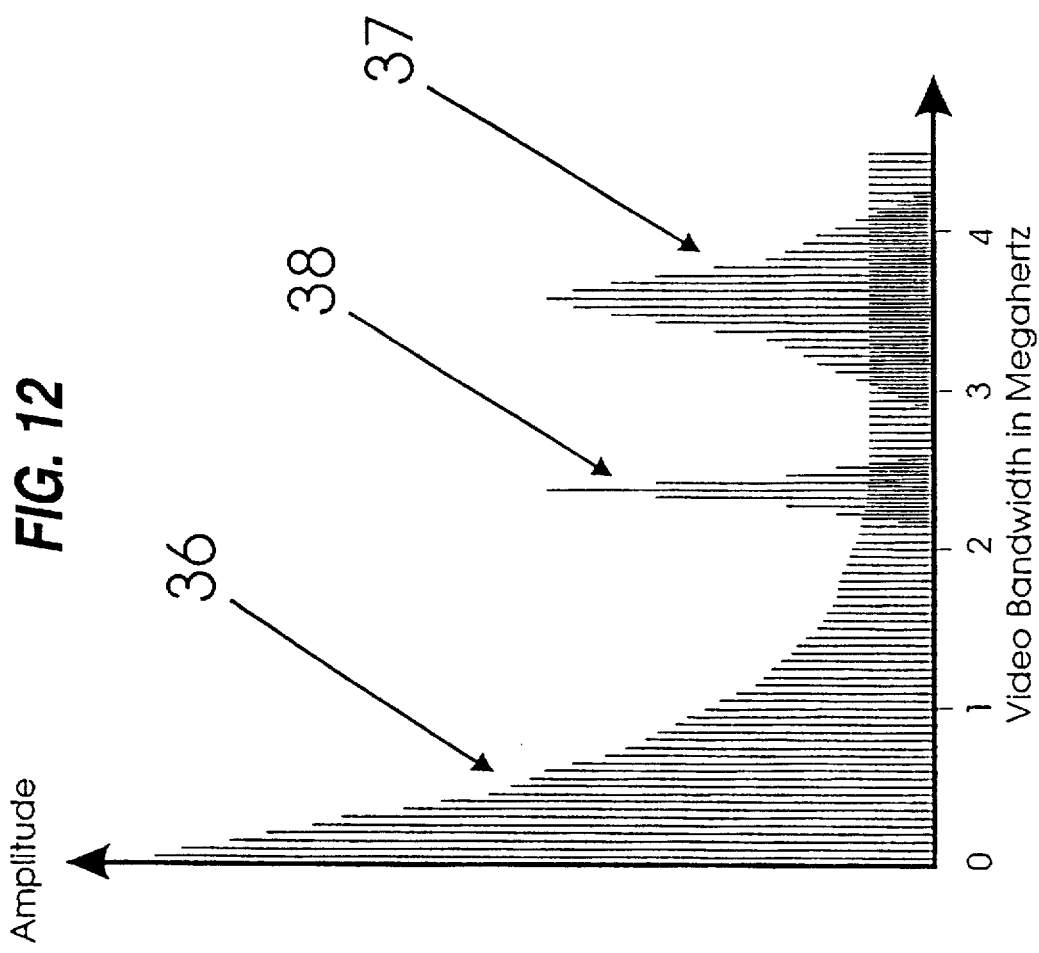

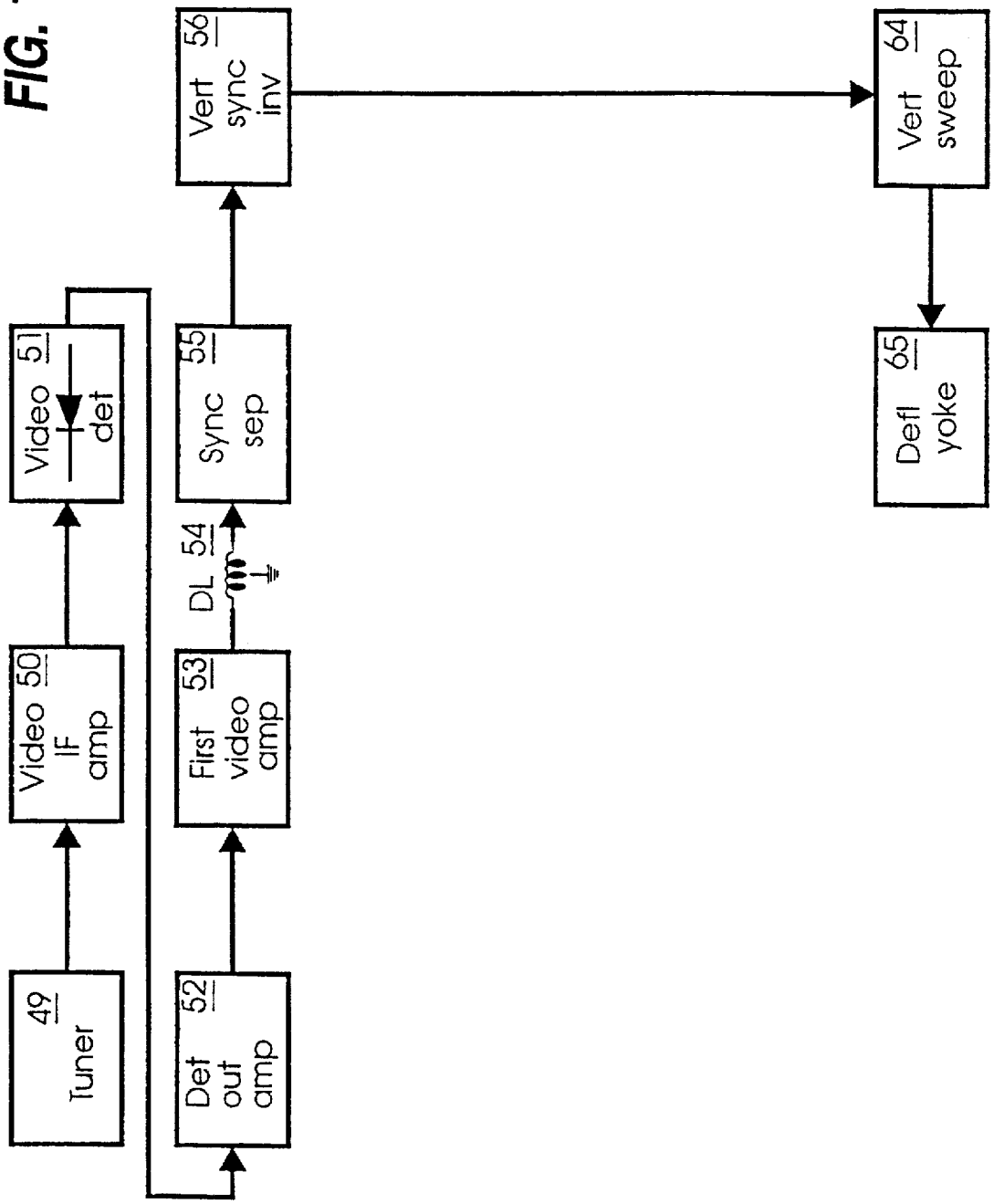

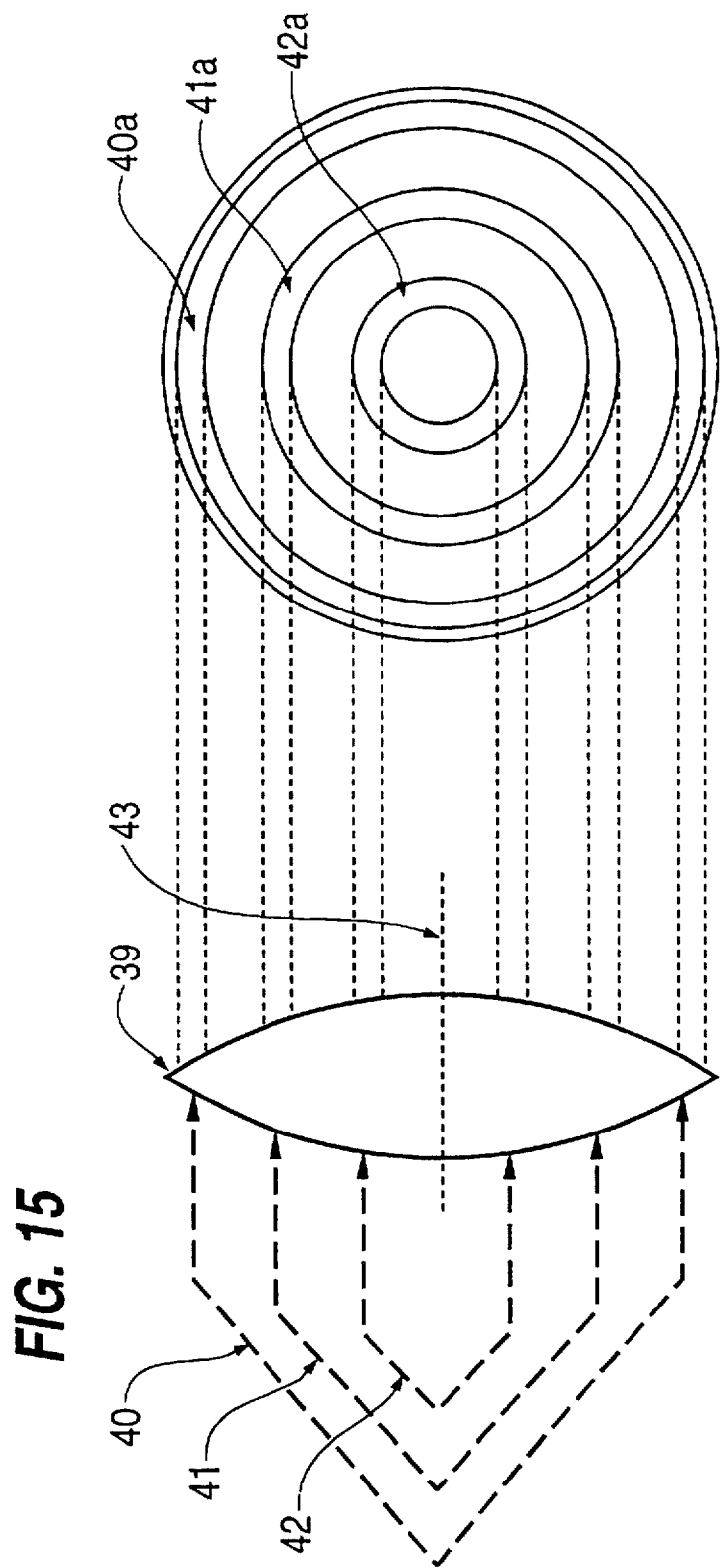

3-D IMAGING SYSTEM

BACKGROUND OF THE INVENTION

The present invention relates to 3-dimensional image display techniques and, in particular, to such a technique in which the use of special headgear or spectacles is not required.

The presentation of fully 3-dimensional images has been a serious technological goal for the better part of the twentieth century. As early as 1908, Gabriel Lippman invented a method for producing a true 3-dimensional image of a scene employing a photographic plate exposed through a "fly's eye" lenticular sheet of small fixed lenses. This technique became known as "integral photography", and display of the developed image was undertaken through the same sort of fixed lens lenticular sheet. Lippman's development and its extensions through the years (for example, U.S. Pat. No. 3,878,329), however, failed to produce a technology readily amenable to images which were simple to produce, adaptable to motion presentation, or capable of readily reproducing electronically generated images, the predominant format of this latter part of the century.

The passage of time has resulted in extensions of the multiple-image-component approach to 3-dimensional imagery into a variety of technical developments which include various embodiments of ribbed lenticular or lattice sheets of optical elements for the production of stereo images from a single specially processed image (for example U.S. Pat. No. 4,957,311 or U.S. Pat. No. 4,729,017, to cite recent relevant examples). Most of these suffer from a common series of deficiencies, which include severe restrictions on the viewer's physical position with respect to the viewing screen, reduced image quality resulting from splitting the produced image intensity between two separate images, and in many, parallax viewable in only one direction.

Other prior art techniques for generating real 3-dimensional images have included the scanning of a physical volume, either by mechanically scanning a laser beam over a rotating helical screen or diffuse vapour cloud, by sequentially activating multiple internal phosphor screens in a cathode-ray tube, or by physically deviating a pliable curved mirror to produce a variable focus version of the conventional image formation device. All of these techniques have proved to be cumbersome, difficult to both manufacture and view, and overall not readily amenable to deployment in the consumer marketplace.

During the same period of time, a variety of technologies relating to viewer-worn appliances emerged, including glasses employing two-colour or cross-polarized filters for the separation of concurrently displayed dual images, and virtual reality display headgear, all related to the production of stereopsis, that is, the perception of depth through the assimilation of separate left- and right-eye images. Some of these have produced stereo images of startling quality, although generally at the expense of viewer comfort and convenience, eye strain, image brightness, and acceptance among a portion of the viewing population who cannot readily or comfortably perceive such stereo imagery. Compounding this is the recently emerging body of ophthalmological and neurological studies which suggest adverse and potentially long-lasting effects from the extended use of stereo imaging systems, user-worn or otherwise.

SUMMARY OF THE INVENTION

The present invention is intended to provide an improved 3-dimensional imaging device which is compact, simple in structure, and which does not require the use by the viewer of any glasses, virtual reality headgear, or any other user appliance.

In order to provide this improved 3-dimensional imaging, the present invention creates a 3-dimensional image by varying the distance of the image from the viewer pixel by individual pixel. The invention employs an array of extremely small, specially designed light-refracting optical elements which are formed such that the focal length of such element, varies across the surface of the optical element. By minutely displacing the entry point at which light is input to these optics for different pixels within an image, a complete image is presented to the viewer in which certain elements are closer to the viewer and others farther, just as in a real-world scene. The scene presented is orthoscopic, and the viewer's eye focuses nearer for nearer parts of the image, and farther for farther parts of that image.

The present invention expressly does not rely for the perception of depth upon the presentation of separate views to the viewer's left and right eyes, thereby overcoming some of the more persistent and more serious flaws inherent in stereoscopic imaging.

According to the present invention, the pixel-level optics may employ one linearly varying light refracting surface, or may in fact employ a larger number of light refracting surfaces.

In its simplest form, the pixels and overlying optical elements are rectangular and the focal length of each optical element varies progressively along the length of the optical element. In this case, the entry point of light is displaced linearly along the length. However, other shapes of optical elements and types of displacement are within the scope of the invention. For example, the optical elements may be circular having a focal length which varies radially with respect to the central optical axis. In such a case the light enters as annular bands which are displaced radially.

The relationship between the focal length and displacement may be linear or non-linear.

A variety of devices may be employed for providing pixel-level light input to the array of pixel-level optics. In one embodiment of the invention, this light input device is a cathode-ray tube placed behind the array of optics, such that a line of light may be scanned horizontally behind each row of pixel-level optics, and presented at a minutely different vertical displacement from the scan line as it passes behind each optic. In different embodiments, the light input device may be a flat panel display device employing technology such as liquid crystal, electroluminescence or plasma display devices. In all of these embodiments, motion imagery is presented by scanning entire images sequentially, in much the same fashion as with conventional 2-dimensional motion imagery. In this fashion, motion imagery may be presented at frame rates limited only by the ability of the scanned light beam to be minutely vertically manipulated for each pixel. While by no means a limiting range of the technology, the embodiments of the present invention described herein have successfully operated in our laboratories at frame rates ranging up to 111 frames per second.

In still another preferred embodiment, pixel-level, whole image illumination may come from specially prepared motion picture or still photography transparency film, in which each frame of film is illuminated from the rear conventionally, but viewed through an array of the same type of pixel-level optics as above. In this embodiment, each transmitted light pixel within each transparency frame is placed specifically along the linear entry surface of the

3 optics such that its vertical point of input generates a point of light placed at the specific distance from the viewer at which that particular pixel is desired to be perceived, just as in the electronically illuminated embodiments above.

In all of these embodiments, the 3-dimensional image may be viewed directly, or employed as the real image source for any conventionally known real image projection system.

BRIEF DESCRIPTION OF THE DRAWINGS

These and other objects and features of the present invention will become apparent from the following description, viewed in conjunction with the attached drawings. Throughout these drawings, like parts are designated by like reference numbers:

FIG. 1(a) is an illustration of one embodiment of a pixel-level optical device, viewed obliquely from the rear.

FIG. 2 illustrates the manner in which varying the point of input of a collimated light beam into the back (input end) of a pixel-level optical device varies the distance in space from the viewer at which that point of light appears.

FIG. 3(b) illustrates a different view of the varying input illumination, and the alignment of the pixel-level optics with pixels on the phosphor layer of the cathode-ray tube.

FIG. 3(c) illustrates the relationship between the size and aspect ratio of the collimated input beam of light to the size and aspect ratio of the pixel-level optical device.

FIG. 9(a) illustrates the process by which a depth signal may be retroactively derived for conventional 2-dimensional imagery, thereby making that imagery capable of being displayed in 3 dimensions on a suitable display device.

4

Figure 11:
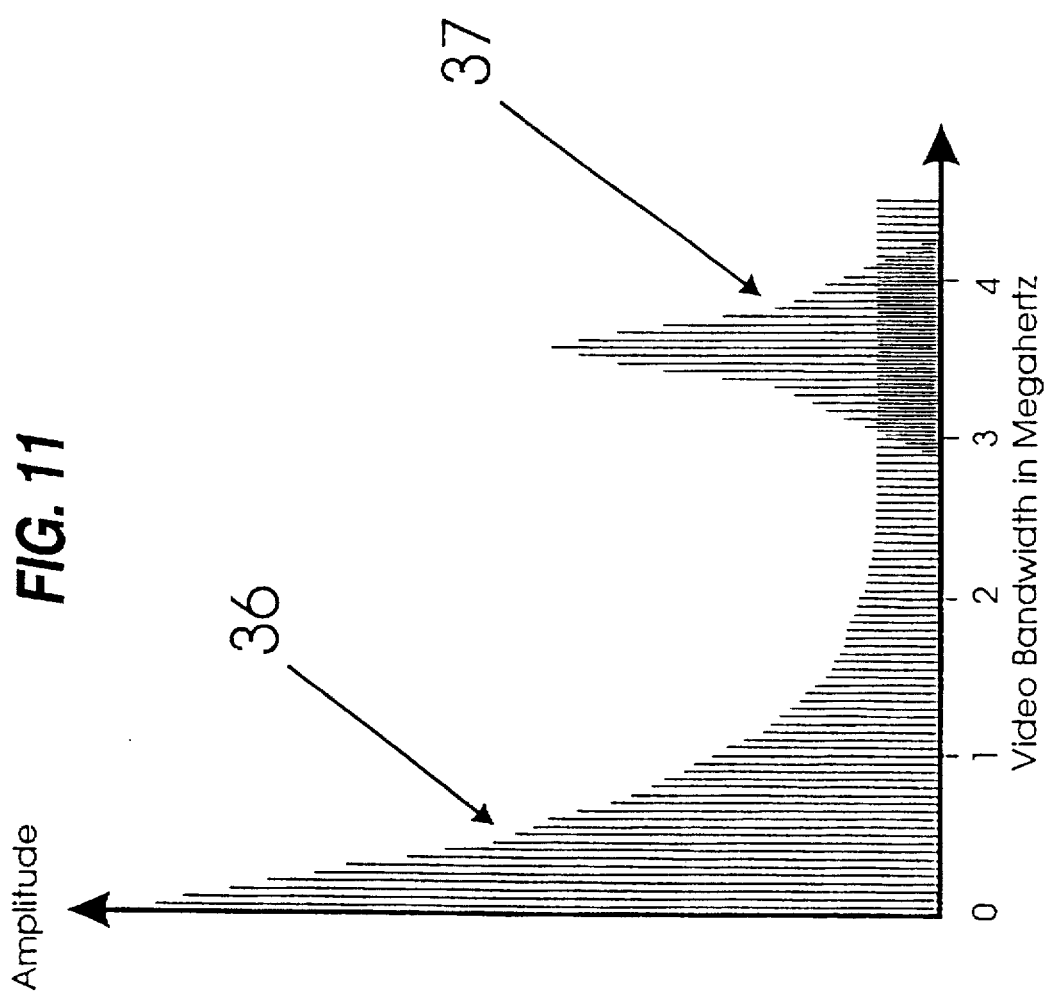

FIG. 11 illustrates the energy distribution of the conventional NTSC video signal, indicating the luminance and chrominance carriers.

FIG. 12 illustrates the same NTSC video signal energy distribution, but with the depth signal encoded into the spectrum.

FIG. 13(a) illustrates the functional design of the circuitry within a conventional television receiver which typically controls the vertical deflection of the scanning electron beam in the cathode-ray tube.

Figure 13B:
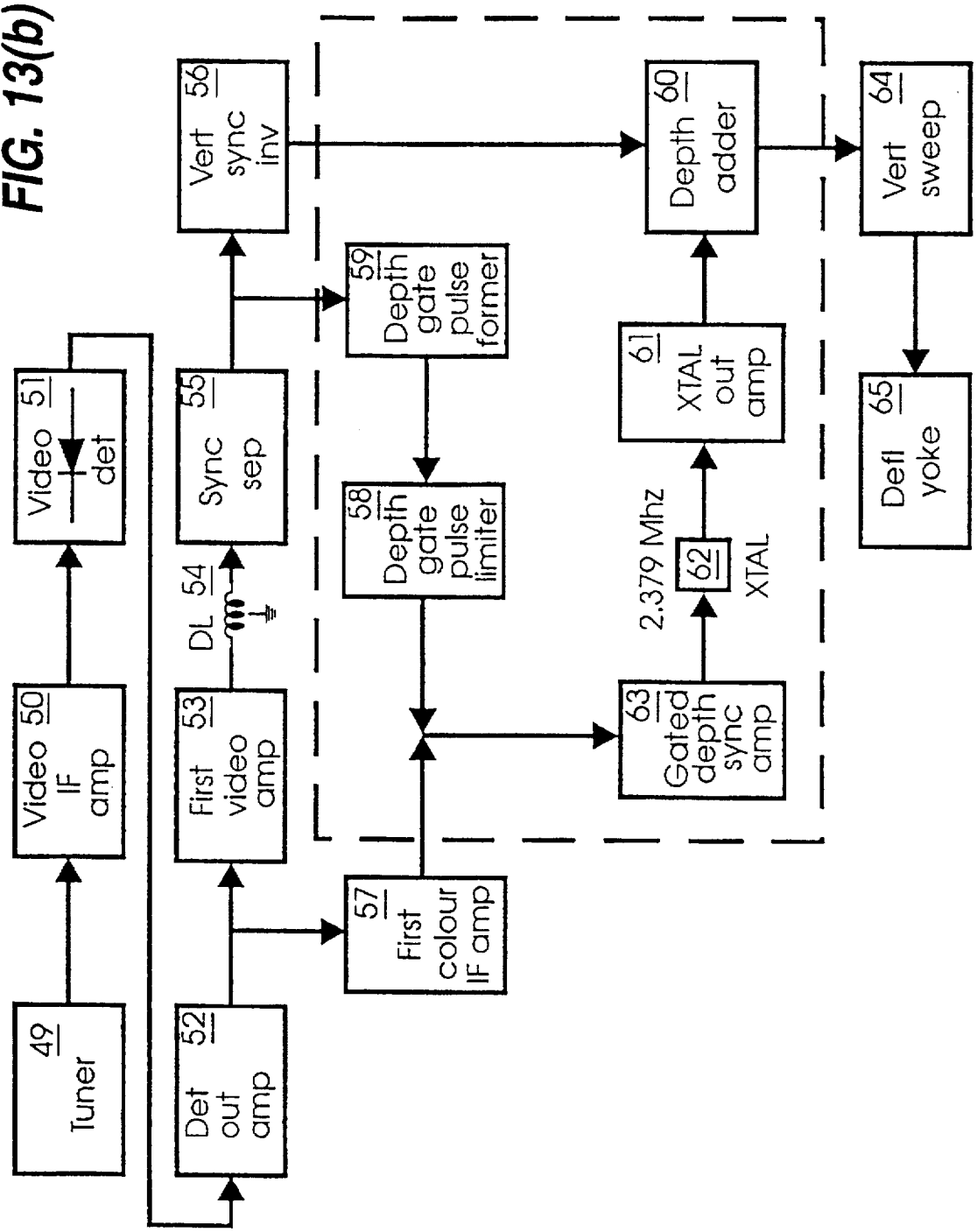

FIG. 13(b) illustrates the same circuitry with the addition of the circuitry required to decode the depth component from a 3-D-encoded video signal and suitably alter the behaviour of the vertical deflection of the scanning electron beam to create the 3-D effect.

Figure 14:
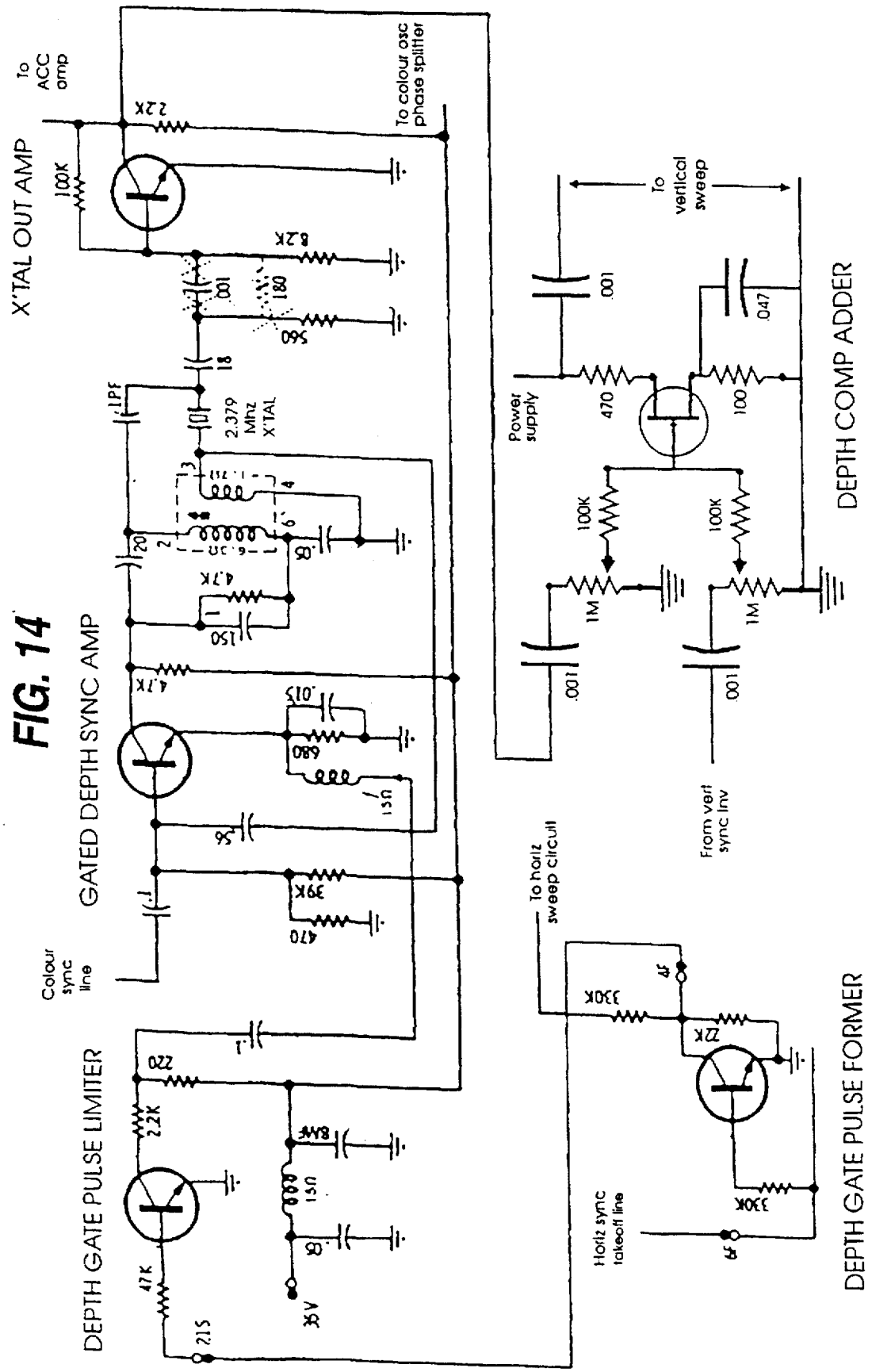

FIG. 14 illustrates a preferred embodiment of the television-based electronic circuitry which executes the depth extraction and display functions outlined in FIG. 13(b).

FIG. 15 illustrates an alternative pixel level optical structure in which the position of the input light varies radially rather than linearly.

DETAILED DESCRIPTION OF THE PREFERRED EMBODIMENT OF THE INVENTION

FIG. 1(a) illustrates in greatly magnified form one possible embodiment of an optical element 2 employed to vary the distance from the viewer at which a collimated point of light input into this device may appear. For reference purposes, the size of such an optical element may vary considerably, but is intended to match the size of a display pixel, and as such, will be typically, for a television monitor, in the order of 1 mm in width and 3 mm in height. Optics as small as 0.5 mm by 1.5 mm have been demonstrated for a computer monitor which is designed to be viewed at closer range, and as large as 5 mm wide and 15 mm high, a size intended for application in a large-scale commercial display designed for viewing at a considerable distance.

The materials from which these pixel-level optics have been made have been, to date, either fused silica glass (index of refraction of 1.498043), or one of two plastics, being polymethyl methacrylate (index of refraction of 1.498) or methyl methacrylate (index of refraction of 1.558). There is, however, no suggestion made that these are the only, or even preferred, optical materials from which such pixel-level optics may be fabricated.

In FIG. 1(a) the pixel level optical element is seen obliquely from the rear, and as may be seen, while the front surface 1 of this optical device is consistently convex from top to bottom, the rear surface varies in shape progressively from convex at the top to concave at the bottom. Both linear and non-linear progressions in the variation of optical properties have been employed successfully. A collimated beam of light is projected through the optical device in the direction of the optical axis 3, and as may be seen, the collective optical refracting surfaces of the device through which that collimated light beam passes will vary as the beam is moved in input point from the top to the bottom of the device.

Figure 1B:
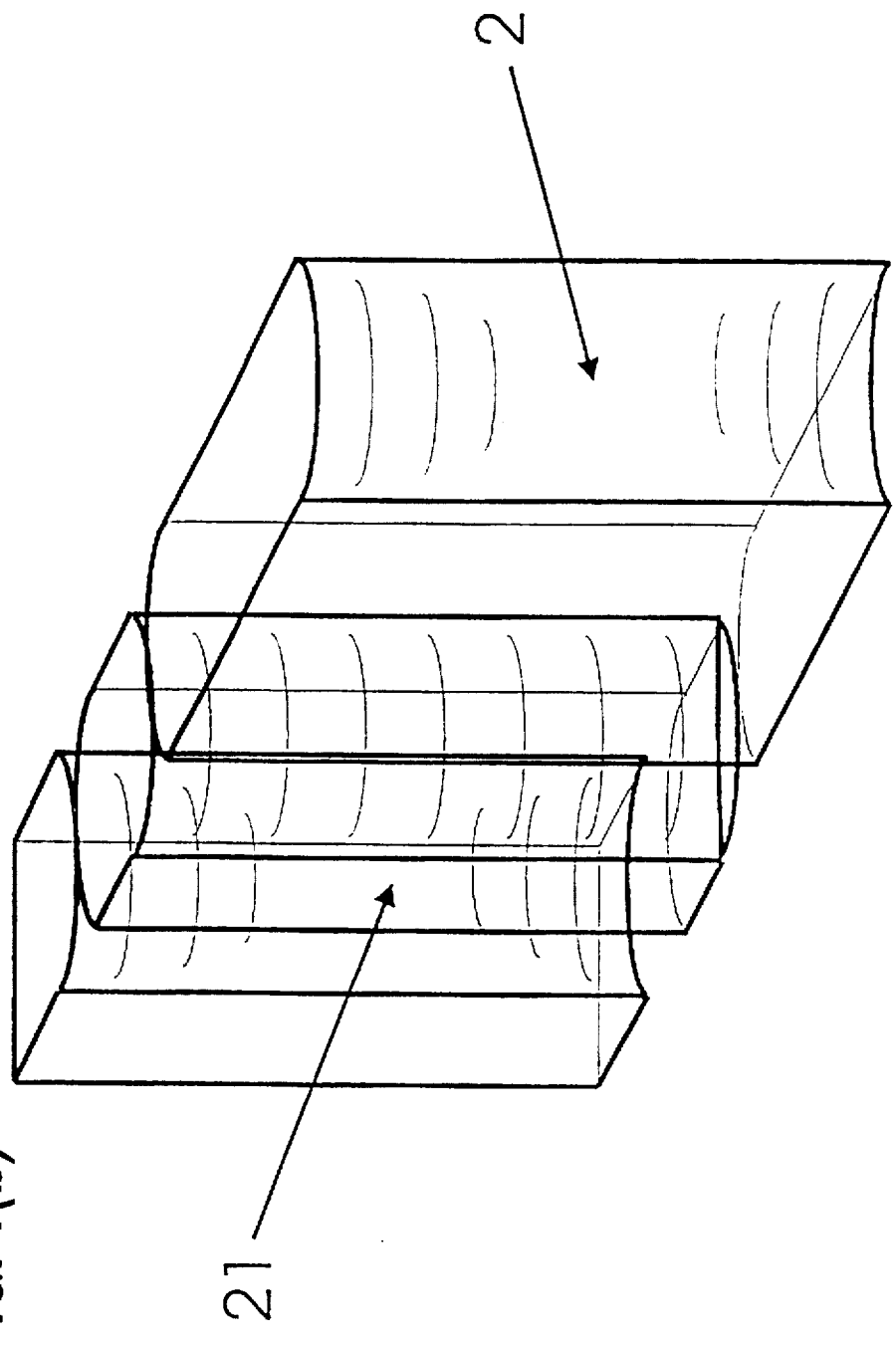
FIG. 1(b) is an illustration of a different embodiment of the same type of pixel-level optical assembly which comprises three optical elements.

Although the embodiment illustrated in FIG. 1(a) possesses one fixed surface and one variable surface, variations on this design are possible in which both surfaces vary, or in which there are more than two optical refracting surfaces. FIG. 1(b), for example, illustrates a second embodiment in which the pixel level optics are a compound optical device composed of three optical elements. Tests in the laboratory suggest that compound pixel-level optical assemblies may provide improved image quality and an improved viewing angle over single element optical assemblies and in fact the most successful embodiment of this technology to date employs 3-element optics. However, as single element optical assemblies do operate in this invention as described herein, the pixel-level optical assemblies illustrated throughout this disclosure will be portrayed as single element assemblies for the purposes of clarity of illustration.

FIG. 2 illustrates, in compressed form for clarity of presentation, a viewer's eyes 4 at a distance in front of the pixel-level optical element 2. A collimated beam of light may be input to the back of optical device 2 at varying points, three of which are illustrated as light beams 5, 6 and 7. As the focal length of device 2 varies depending upon the input point of the light beam, FIG. 2 illustrates how the resulting point of light will be presented to the viewer at different apparent points in space 5a,6a or 7a, corresponding to the particular previously described and numbered placement of input beams. Although points 5a, 6a and 7a are in fact vertically displaced from one another, this vertical displacement is not detectable by the observer, who sees only the apparent displacement in depth.

Figure 3A:
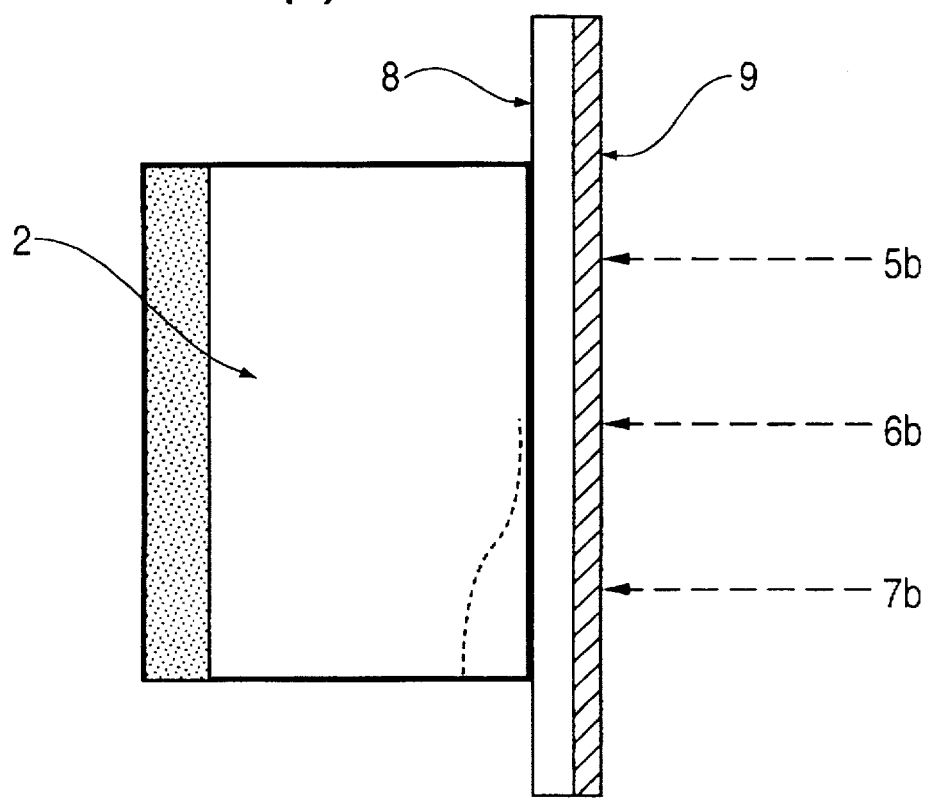
FIG. 3(a) illustrates how this varying input illumination to a pixel-level optical device may be provided in one preferred embodiment by a cathode-ray tube.

FIG. 3(a) illustrates how, in one preferred embodiment of this invention, each individual pixel-level optical device may be placed against the surface of a cathode-ray tube employed as the illumination source. In this drawing, optical element 2 rests against the glass front 8 of the cathode-ray tube, behind which is the conventional layer of phosphors 9 which glow to produce light when impacted by a projected and collimated beam of electrons, illustrated at different positions in this drawing as beams 5b, 6b and 7b. For each of these three illustrative electron beam positions, and for any other beam position within the spatial limits of the pixel-level optical device, a point of light will be input at a unique point on the back of the pixel-level optics. The vertical position of the electron beam may be varied using entirely conventional electromagnetic beam positioning coils as found on conventional cathode-ray tubes, according to a specially prepared signal. The pattern of phosphors on the cathode-ray tube, however, must match the arrangement of pixel-level optics, in both length and spatial arrangement, that is, an optic must be capable of being illuminated by the underlying phosphor throughout its designed linear input surface. FIG. 3(b) illustrates this arrangement through an oblique rear view of pixel-level optic 2. In this diagram, adjacent phosphor pixels 35, of which 9 are presented, will be of 3 different colours as in a conventional colour cathode-ray tube, and of an essentially rectangular shape. Note that the size and aspect ratio (that is, length to width ratio) of each phosphor pixel matches essentially that of the input end of the pixel-level optic which it faces. As may be seen by observing the phosphor pixel represented by shading, the electron beam scanning this phosphor pixel can be focused at any point along the length of the phosphor pixel, illustrated here by the same 3 representative electron beams 5b, 6b and 7b. The result is that the point at which light is emitted is displaced minutely within this pixel.

FIG. 3(c) illustrates the importance of the size and aspect ratio of the beam of light which is input to pixel-level optical device 2, here shown from the rear. The visual display of depth through a television tube is more akin in resolution requirement to the display of chrominance, or colour, than to the display of luminance, or black-and-white component, of a video image. By this we mean that most of the perceived fine detail in a video image is conveyed by the relatively high resolution luminance component of the image, over which a lower resolution chrominance component is displayed. It is possible to have a much lower resolution in the chrominance because the eye is much more forgiving where the perception of colour is concerned than where the perception of image detail is concerned. Our research in the laboratory has suggested that the eye is similarly forgiving about the perception of depth in a television image.

Having said that, however, the display of viewable depth is still generated by the physical movement of a light beam which is input to a linear pixel-level optical device, and it will be obvious that the greater the range of movement of that input light beam, the greater opportunity to influence viewable depth.

In FIG. 3(c), pixel-level optical device 2 is roughly three times as high as it is wide. Collimated input light beam 66a, shown here in cross-section, is round, and has a diameter approximating the width of optical device 2. Collimated input light beam 66b is also round, but has a diameter roughly one-fifth of the length of optical device 2. On one hand, this allows beam 66b to traverse a greater range of movement than beam 66a, providing the prospect of a greater ranger of viewable depth in the resulting image, but on the other hand, this is at the expense of a cross-sectional illuminating beam area which is only approximately 36 percent of that of beam 66a. In order to maintain comparable brightness in the resulting image, the intensity of input beam 66b will have to be approximately 2.7 times that of beam 66a, an increase which is entirely achievable.

Beam 66c is as wide as the pixel-level optical device 2, but is a horizontal oval of the height of beam 66b, that is, only one-fifth the height of optical device 2. This resulting oval cross-section of the illuminating beam is less bright than circular beam 66a, but almost twice as bright as smaller circular beam 66b. This design is proving in the laboratory to provide a most promising balance between resolution in displayed depth and image brightness, and is in fact the beam cross-section employed in our latest and most preferred embodiments of the invention. Clearly, a perfectly rectangular beam cross-section is also a promising shape, and is expected to be built quite shortly.

Figure 4A:
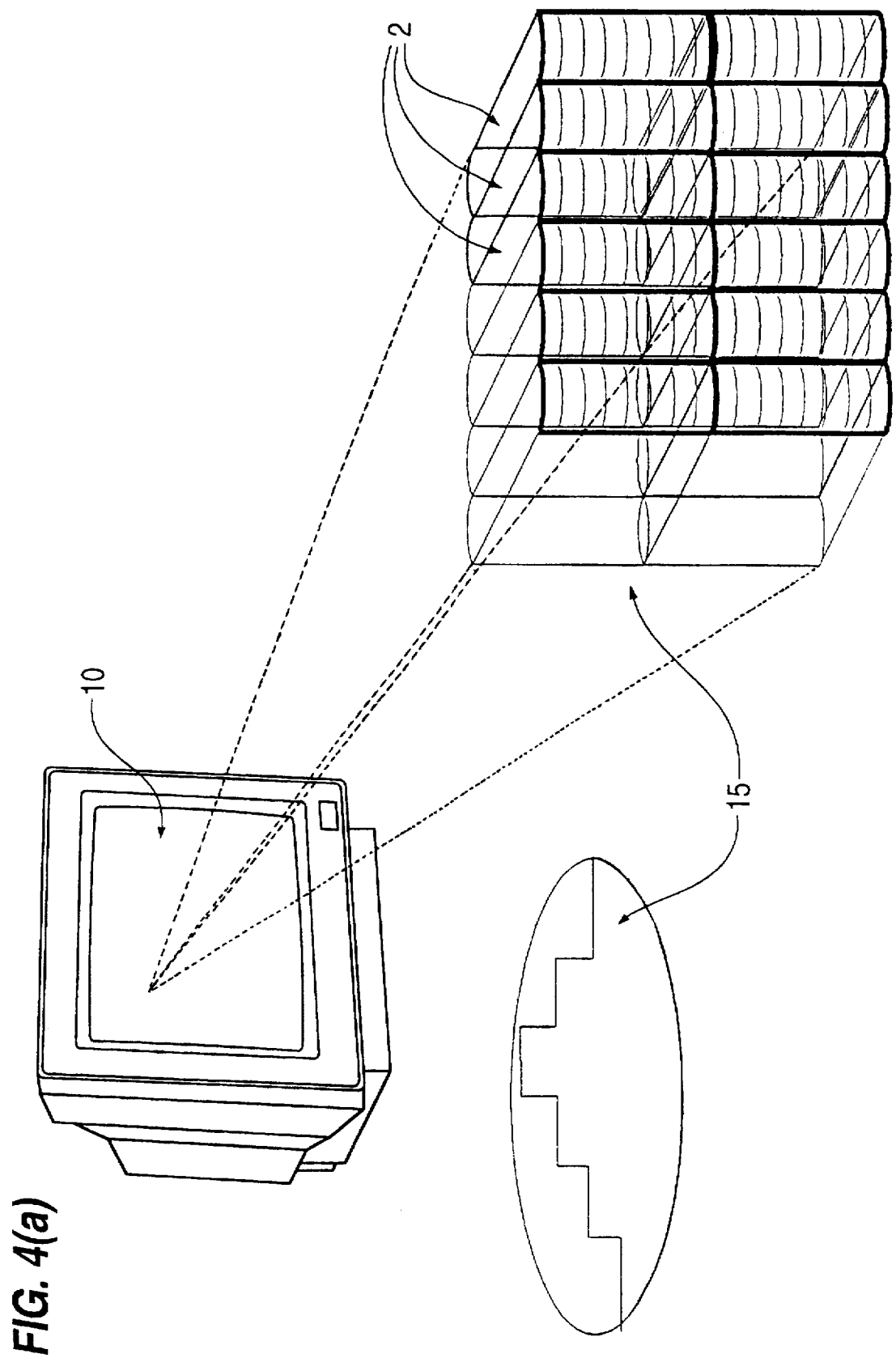
FIG. 4(a) illustrates how an array of pixel-level optics is presented across the front of an illumination source such as the cathode-ray tube in a computer monitor, television or other essentially flat screen imaging device.

FIG. 4(a) illustrates how the pixel-level optics 2 are arranged into an array of rows, twelve of which are pictured for illustrative purposes, and how these are placed on the front of an illumination source, here pictured as a cathode-ray tube 10 in one preferred embodiment. As the controlled electron beam is scanned across a row of pixel-level optics, its vertical displacement is altered individually for each pixel, producing a horizontal scan line which is represented for illustrative purposes as line 15, shown both as a dotted line behind the pixel array and separately for clarity as a solid line within the ellipse to the left. As may be seen, the horizontal scan line which, in a conventional cathode-ray display is straight, is minutely displaced from the midline of the scan for each individual pixel, thereby creating an image which, varying in its distance from the viewer as it does pixel by individual pixel, contains substantial resolution in its depth perception.

Experience has shown that a minute interstitial gap between the individual pixel-level optical elements, on the order of 0.25 mm, minimizes optical "cross-talk" between optical elements, resulting in enhanced image clarity, and that this isolation of the optics can be further enhanced by the intrusion of a black, opaque material into these interstitial spaces.

Arrays of these pixel-level optics have been built through the process of manually attaching each individual optic to the surface of an appropriate cathode-ray tube using an optically neutral cement. This process is, of course, arduous, and lends itself to placement errors through the limitations in accuracy of hand-assisted mechanics. Arrays of optics have, however, been very successfully manufactured by a process of producing a metal "master" of the complete array of optics in negative, and then embossing the usable arrays of optics into thermoplastic materials to produce a "pressed" replica of the master which is then cemented, in its entirety, to the surface of the cathode-ray tube. Replication of highly detailed surfaces through embossing has been raised to an artform in recent years through the technical requirements of replicating highly detailed, information-rich media such as laser discs and compact discs, media typically replicated with great accuracy and low cost in inexpensive plastic materials. It is anticipated that the preferred manufacturing technique for generating mass-produced arrays of pixel-level optics will continue to be an embossing process involving thermoplastic materials. To date, three layers of different pixel-level optics, each representing a different optical element, have been successfully cemented together to produce an array of 3-element micro-optics.

In the placement of the pixel level optics onto the surface of the cathode-ray or other light-generating device, precise alignment of the optics with the underlying pixels is critical. Vertical misalignment causes the resulting image to have a permanent bias in the displayed depth, while horizontal misalignment causes constraint of the lateral viewing range afforded by the 3-D display device. As well, the optical linkage between the light-generating pixels and the input surface of the pixel-level optics is enhanced by minimizing where possible the physical distance between the illuminating phosphor and the input surface of the optics. In a cathode-ray tube environment, this implies that the front surface glass of the tube to which the optics are applied should be of the minimal thickness consistent with adequate structural integrity. In large cathode-ray monitors, this front surface may be as thick as 8 mm, but we have successfully illustrated the use of these optics with a specially constructed cathode-ray tube with a front surface thickness of 2 mm. One highly successful embodiment of a cathode-ray tube has been constructed in which the pixel-level optics have actually been formed from the front surface of the tube.

FIGS. 3(b) and 4(a) illustrate an essentially rectangular pattern of image tube pixels 35 and pixel-level linear optical elements 2, that is, arrays in which the rows are straight, and aligned pixel to pixel with the rows both above and below. This pattern of pixels and optics produces highly acceptable 3-D images, but should not be assumed to be the only such pattern which is possible within the invention.

Figure 4B:
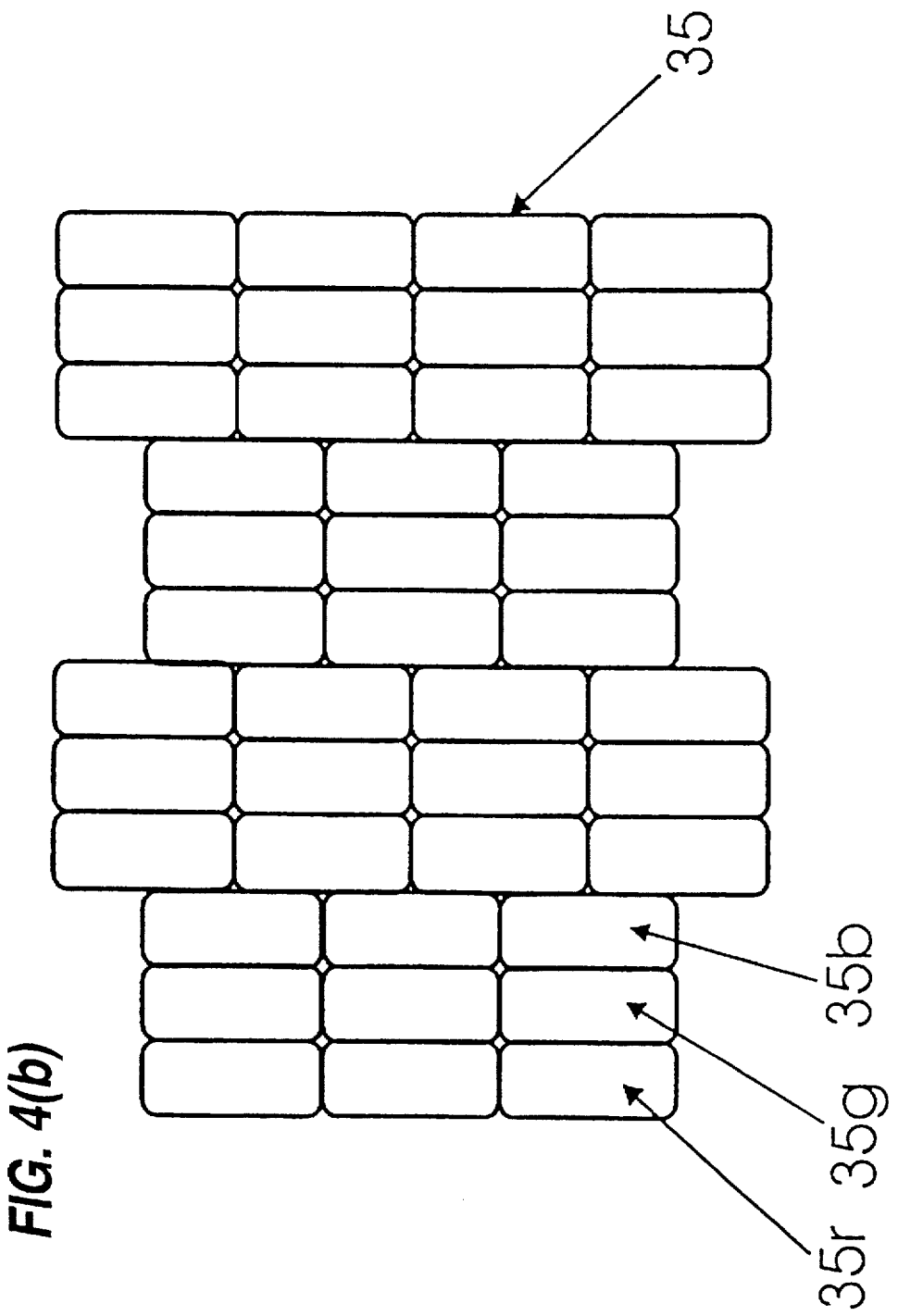
FIG. 4(b) illustrates a second preferred pattern of image tube pixels which may be employed for the purpose.

FIG. 4(b) illustrates a second preferred pattern of pixels 35 in which horizontal groups of three pixels are vertically off-set from those to the left and right of the group, producing a "tiled" pattern of three-pixel groups. As this configuration has been built in the laboratory, the three-pixel groups, comprise one red pixel 35r, one green pixel 35g and one blue pixel 35b. As in a conventional 2-D television tube, colour images are built up from the relative illumination of groups, or "triads" of pixels of these same three colours. A different ordering of the three colours is possible within each triad, but the order illustrated in FIG. 4(b) is the embodiment which has been built to date in our laboratory.

Figure 5:
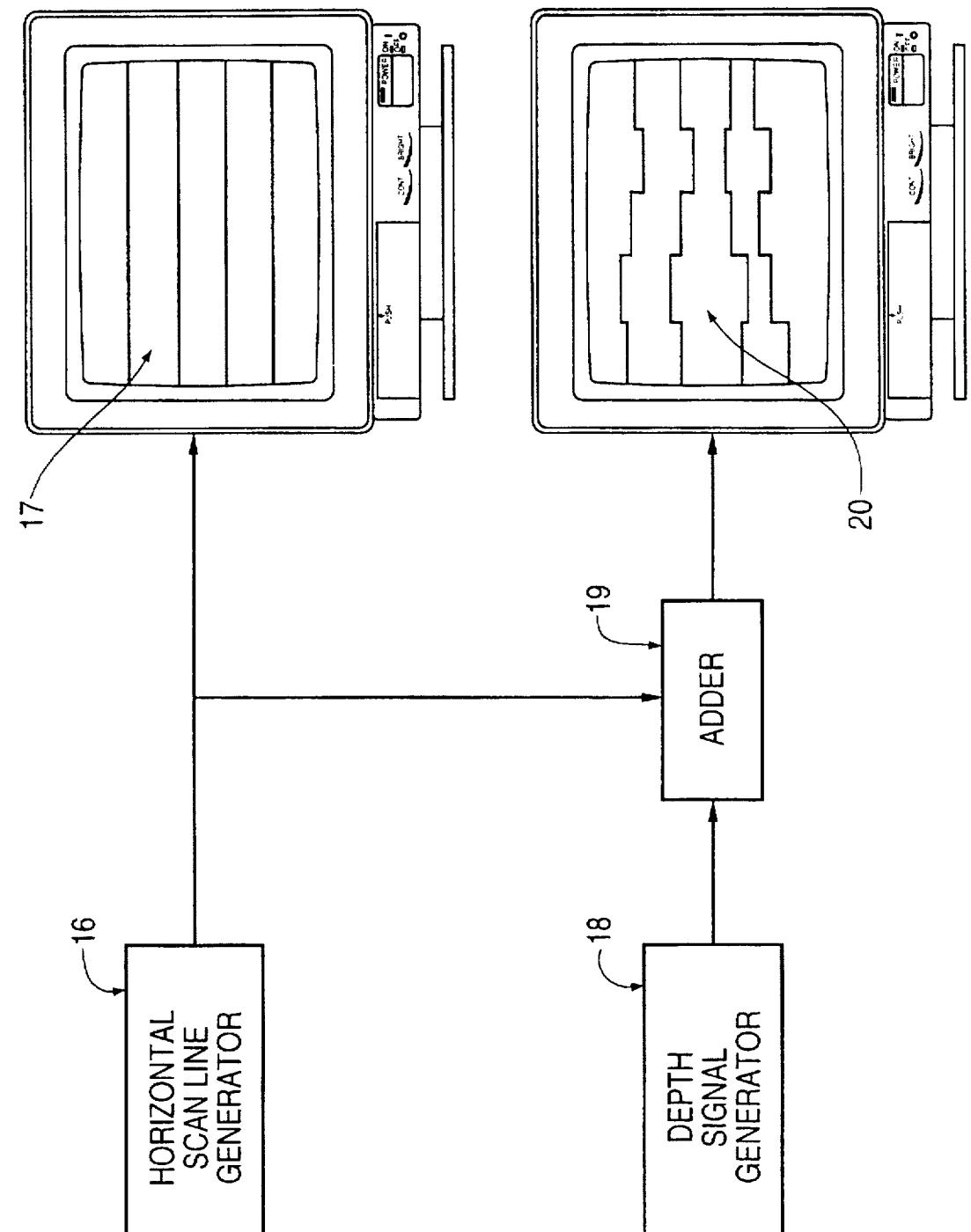
FIG. 5 illustrates the manner in which the depth signal is added to the horizontally scanned raster lines in a television or computer monitor image.

FIG. 5 illustrates the minute modification by the depth signal of the horizontal scan lines in a raster image such as a conventional television picture. In the conventional cathode-ray television or computer monitor tube shown at the top right of FIG. 5, each individual picture in a motion sequence is produced by an electron beam which scans horizontally line by line down the screen, illustrated in FIG. 5 by four representative scan lines 17. This highly regular scanning is controlled within the electronics of the television or computer monitor by a horizontal scan line generator 16, and not even variations in the luminance or chrominance components of the signal create variations in the regular top-to-bottom progression of the horizontal scan lines.

The present invention imposes a variation on that regularity in the form of the minute displacements from a straight horizontal scan which produce the depth effect. Such variation is physically effected through the use of a depth signal generator 18 whose depth signal is added through adder 19 to the straight horizontal lines to produce the minute variations in the vertical position of each horizontal scan line, producing lines which representatively resemble lines 20. The depth signal generator portrayed in FIG. 5 is a generic functional representation; in a television set, the depth signal generator is the conventional video signal decoder which currently extracts luminance, chrominance and timing information from the received video signal, and which is now enhanced as described below to extract depth information which has been encoded into that signal in an entirely analogous fashion. Similarly, in a computer, the depth component generator is the software-driven video card, such as a VGA video card, which currently provides luminance, chrominance and timing information to the computer monitor, and which will also provide software-driven depth information to that monitor.

Figure 6:
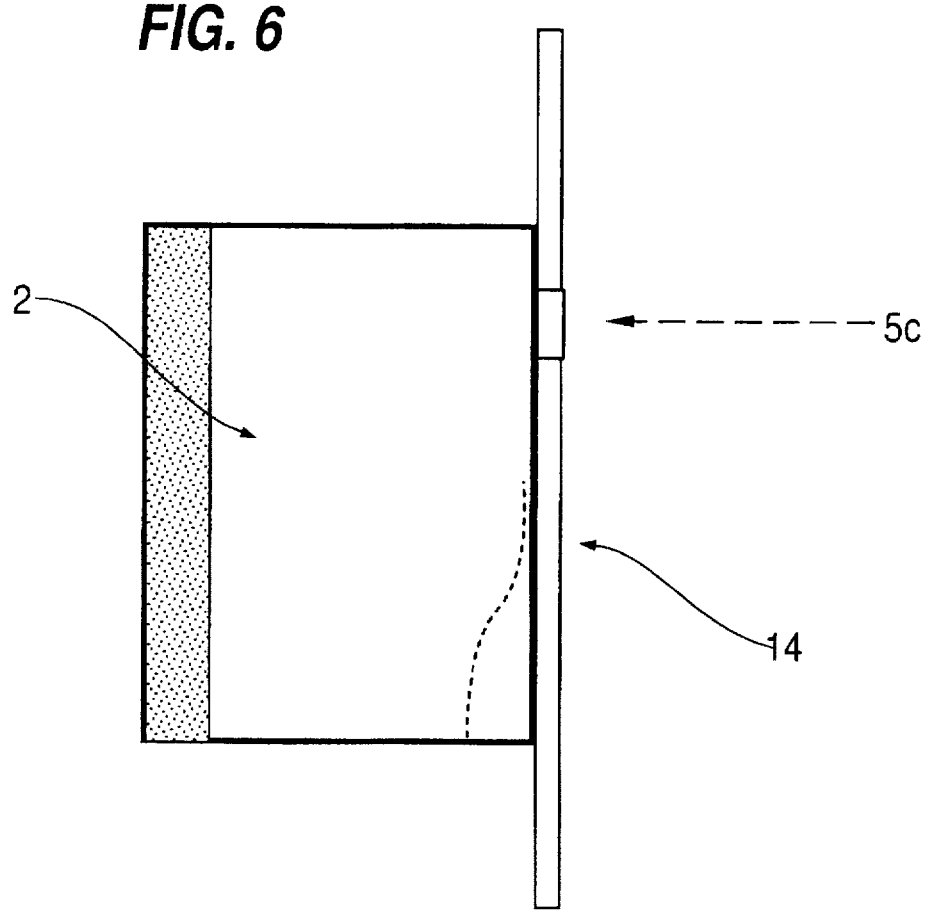
FIG. 6 illustrates how the specific point of light input to pixel-level optics may be varied using motion picture film or some other form of illuminated transparency as the illumination source.

FIG. 6 illustrates the manner in which a film transparency 14 may be employed to provide the controlled input illumination to the pixel-level optical device 2 in another preferred embodiment of the invention. In this example, the portion of the film which is positioned behind the illustrated optical element is opaque except for one transparent point designed to allow light to enter the optical device at the desired point. The film-strip is conventionally illuminated from the rear, but only the light beam 5c is allowed through the transparent point in the film to pass through optical element 2. As may be seen, this situation is analogous to the situation in FIG. 3, in which a controlled electron beam in a cathode-ray tube was used to select the location of the illumination beam. The film transparencies employed may be of arbitrary size, and embodiments utilizing transparencies as large as eight inches by ten inches have been built.

Figure 7:
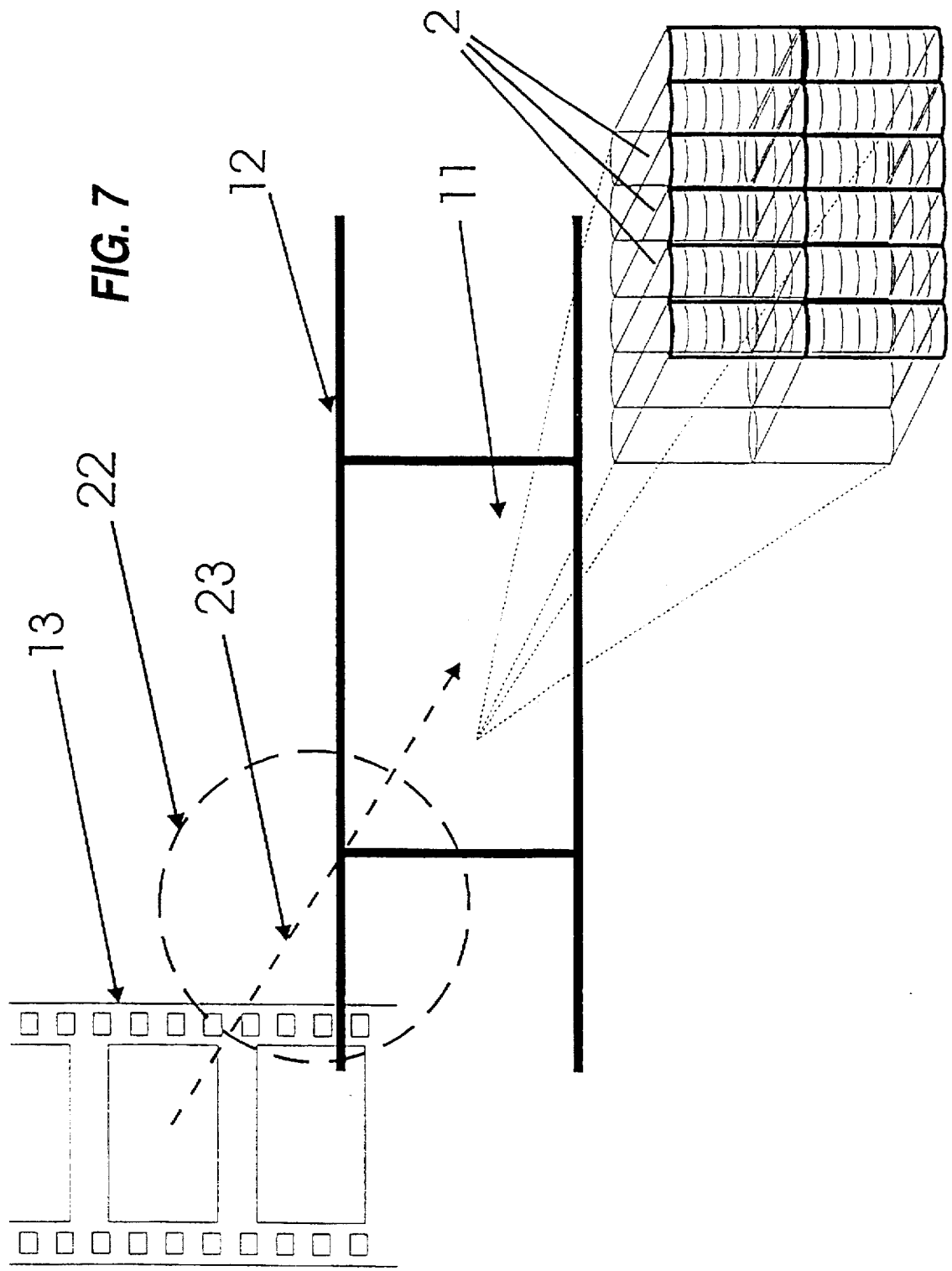
FIG. 7 illustrates how an array of pixel-level optics may be employed to view a continuous strip of motion picture film for the viewing of sequential frames of film in the display of 3-dimensional motion pictures.

FIG. 7 illustrates the manner in which an array 11 of pixel-level optical elements 2, twelve of which are pictured for illustrative purposes, may be employed to display imagery from a specially prepared film strip 13. Optical array 11 is held in place with holder 12. An image on film strip 13 is back-lit conventionally and the resulting image focused through a conventional projection lens system, here represented by the dashed circle 22, onto array 11, which is coaxial with film strip 13 and projection lens 22 on optical axis 23. The 3-dimensional image generated may be viewed directly or may be employed as the image generator for a 3-dimensional real image projector of known type. As well, the 3-dimensional images generated may be viewed as still images, or in sequence as true 3-dimensional motion pictures at the same frame rates as conventional motion pictures. In this embodiment, the individual pixels in film strip 13 may be considerably smaller than those utilized for television display, as the resulting pixels are intended for expansion on projection; the resolution advantage of photographic film over television displays easily accommodates this reduction in pixel size.

Figure 8:
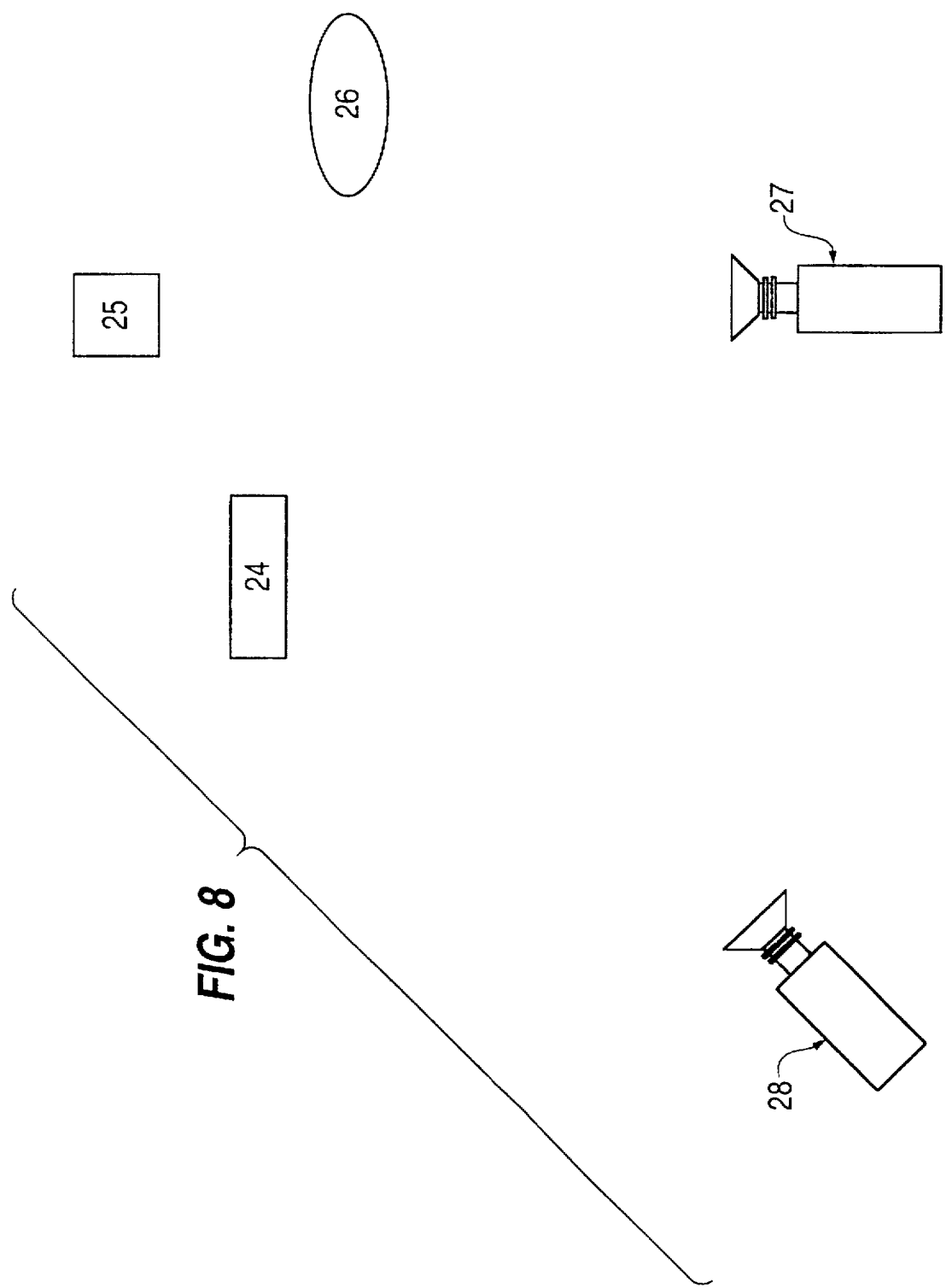
FIG. 8 illustrates a method whereby the depth component of a recorded scene may be derived through image capture which employs one main imaging camera and one secondary camera.

FIG. 8 illustrates a scene in which two cameras are employed to determine the depth of each object in a scene, that is, the distance of any object within the scene from the main imaging camera. A scene to be captured, here viewed from above, is represented here by a solid rectangle 24, a solid square 25 and a solid ellipse 26, each at a different distance from the main imaging camera 27, and therefore each possessing different depth within the captured scene. The main imaging camera 27 is employed to capture the scene in its principal detail from the artistically preferred direction. A secondary camera 28 is positioned at a distance from the first camera, and views the scene obliquely, thereby capturing a different view of the same scene concurrently with the main imaging camera. Well known techniques of geometric triangulation may then be employed to determine the true distance from the main imaging camera which each object in the scene possesses.

One preferred manner in which these calculations may be done, and the resulting depth signal generated, is in a post-production stage, in which the calculations related to the generation of the depth signal are done "off-line", that is, after the fact of image capture, and generally at a site remote from that image capture and at a pace of depth signal production which can be unrelated to the pace of real-time image capture. A second preferred manner of depth signal generation is that of performing the requisite calculation in "real-time", that is, essentially as the imagery is gathered. The advantage of the real-time depth signal generation is that it enables the production of "live" 3-dimensional imagery. The computing requirements of real-time production, however, are substantially greater than that of an "off-line" process, in which the pace may be extended to take advantage of lower, but lower cost, computing capability. Experiments conducted in the laboratory suggest that the method of conducting the required computation in real-time which is preferred for reasons of cost and compactness of electronic design is through the use of digital signal processors (DSP's) devoted to image processing, ie. digital image processors (DIP's), both of these being specialized, narrow-function but high speed processors.

As the secondary camera 28 is employed solely to capture objects from an angle different from that of the main imaging camera, this secondary camera may generally be of somewhat lower imaging quality than the main imaging camera, and therefore of lower cost. Specifically within motion picture applications, while the main imaging camera will be expensive and employ expensive film, the secondary camera may be a low cost camera of either film or video type. Therefore, as opposed to conventional filmed stereoscopic techniques, in which two cameras, each employing expensive 35 mm. or 70 mm. film, must be used because each is a main imaging camera, our technique requires the use of only one high quality, high cost camera because there is only one main imaging camera.

FIG. 9(a) illustrates the principal steps in the process by which a depth signal may be derived for conventional 2-dimensional imagery, thereby enabling the process of retro-fitting 3-D to conventional 2-D imagery, both film and video.

In FIG. 9(a), the same series of three objects 24, 25 and 26 which were portrayed in a view from above in FIG. 8 are now viewed on a monitor from the front. In the 2-D monitor 29, of course, no difference in depth is apparent to the viewer.

In our process of adding the depth component to 2-D imagery, the scene is first digitized within a computer workstation utilizing a video digitizing board. A combination of object definition software, utilizing well-known edge detection and other techniques, then defines each individual object in the scene in question so that each object may be dealt with individually for the purposes of retrofitting depth. Where the software is unable to adequately define and separate objects automatically, a human Editor makes judgmental clarifications, using a mouse, a light pen, touch screen and stylus, or similar pointing device to outline and define objects. Once the scene is separated into individual objects, the human Editor arbitrarily defines to the software the relative distance from the camera, i.e. the apparent depth, of each object in the scene in turn. The process is entirely arbitrary, and it will be apparent that poor judgement on the part of the Editor will result in distorted 3-D scenes being produced.

In the next step in the process, the software scans each pixel in turn within the scene and assigns a depth component to that pixel. The result of the process is represented by depth component scan line 31 on monitor 30, which represents the representative depth signal one would obtain from a line of pixels across the middle of monitor scene 29, intersecting each object on the screen. The top view of the placement of these objects presented in FIG. 8 will correlate with the relative depth apparent in the representative depth component scan line 31 in FIG. 9(a).

Figure 9B:
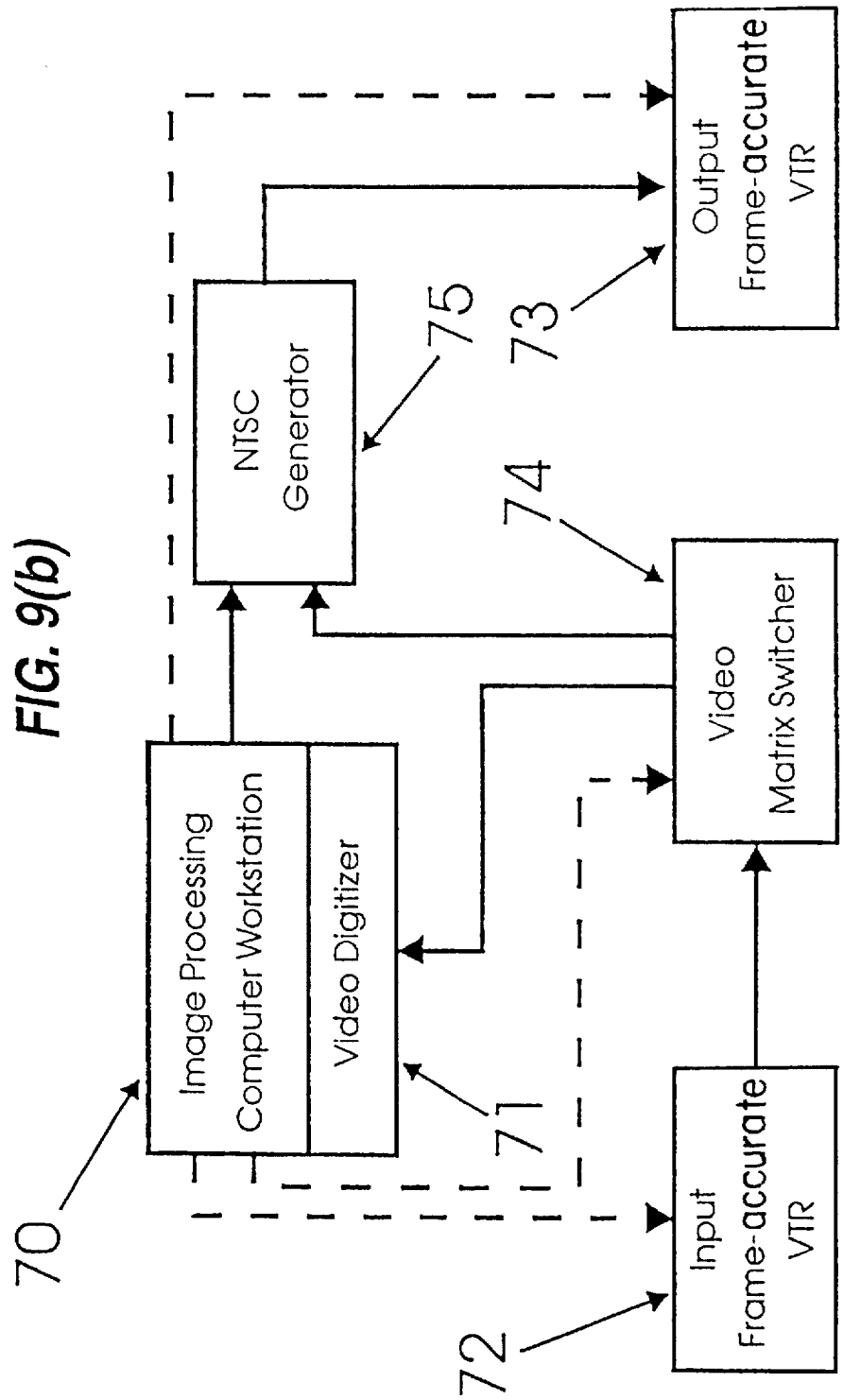
FIG. 9(b) illustrates the interconnection and operation of image processing devices which may be employed to add depth to video imagery according to the process illustrated in FIG. 9(a).

The interconnection and operation of equipment which may be employed to add depth to video imagery according to this process is illustrated in FIG. 9(b). In this drawing, an image processing computer workstation 70 with an embedded video digitizer 71 controls an input video tape recorder (VTR) 72, and output video tape recorder 73, and a video matrix switcher 74 (control is illustrated with the dashed lines in FIG. 9(b), and signal flow with solid lines). The video digitizer accepts a frame of video from the input VTR through the matrix switcher on command from the workstation. The frame is then digitized, and the object definition process described in FIG. 9(a) is applied to the resulting digital scene. When the depth signal has been calculated for this frame, the same frame is input to an NTSC video generator 75 along with the calculated depth component, which is added to the video frame in the correct place in the video spectrum by the NTSC generator. The resulting depth-encoded video frame is then written out to the output VTR 73, and the process begins again for the next frame.

Several important points concerning this process have emerged during its development in the laboratory. The first such point is that as the depth component is being added by an NTSC generator which injects only the depth component without altering any other aspect of the signal, the original image portion of the signal may be written to the output VTR without the necessity for digitizing the image first. This then obviates the visual degradation imparted by digitizing an image and reconverting to analog form, and the only such degradation which occurs will be the generation-to-generation degradation inherent in the video copy process, a degradation which is minimized by utilizing broadcast format "component video" VTR's such as M-II or Betacam devices.

The second such point is that as this is very much a frame-by-frame process, what are termed "frame-accurate" VTR's are a requirement for depth addition. The Editor must be able to access each individual frame on request, and have that processed frame written out to the correct place on the output tape, and only devices designed to access each individual frame (for example, according to the SMPTE time code) are suitable for such use.

The third such point is that the whole process may be put under computer control, and may be therefore operated most conveniently from a single computer console rather than from several separate sets of controls. Given the availability of computer controllable broadcast level component VTR's, certain aspects of the depth addition process may be semi-automated by exploiting such computer-VTR links as the time-consuming automated rewind and pre-roll.

The fourth such point is that the software may be endowed with certain aspects of what is commonly referred to as "artificial intelligence" or "machine intelligence" to enhance the quality of depth addition at a micro feature level. For example, we are working in the lab to develop a software sub-module which will add greater reality to the addition of depth to human faces, utilizing the topology of the human face, i.e. the fact that the nose protrudes farther than the cheeks, which slope back to the ears, etc., each feature with its own depth characteristics. This will alleviate the requirement for much Editor input when dealing with many common objects found in film and video (human faces being the example employed here).

The fifth such point is that the controlling software may be constructed so as to operate in a semi-automatic fashion. By this it is meant that, as long as the objects in the scene remain relatively constant, the controlling workstation may process successive frames automatically and without additional input from the Editor, thereby aiding in simplifying and speeding the process. Of course, the process will once again require Editorial input should a new object enter the scene, or should the scene perspective change inordinately. While we have not yet done so, we fully anticipate being able to introduce artificial intelligence features into the software which will automatically calculate changes in depth for individual objects in the scene based upon changes in perspective and relative object size.

The sixth such point is that when working with still or motion picture film as the input and output media, the input VTR 72, the output VTR 73 and the video matrix switcher 74 may be replaced, respectively, with a high resolution film scanner, a digital data switch and a high resolution film printer. The remainder of the process remains essentially the same as for the video processing situation described above. In this circumstance, the injection of the depth signal using the NTSC generator is obviated by the film process outlined in FIG. 8.

Attached as Appendix A is a copy of some of the software listing used under laboratory conditions to achieve the retro-fitting discussed above with reference to FIGS. 9(a) and 9(b).

Figure 10:
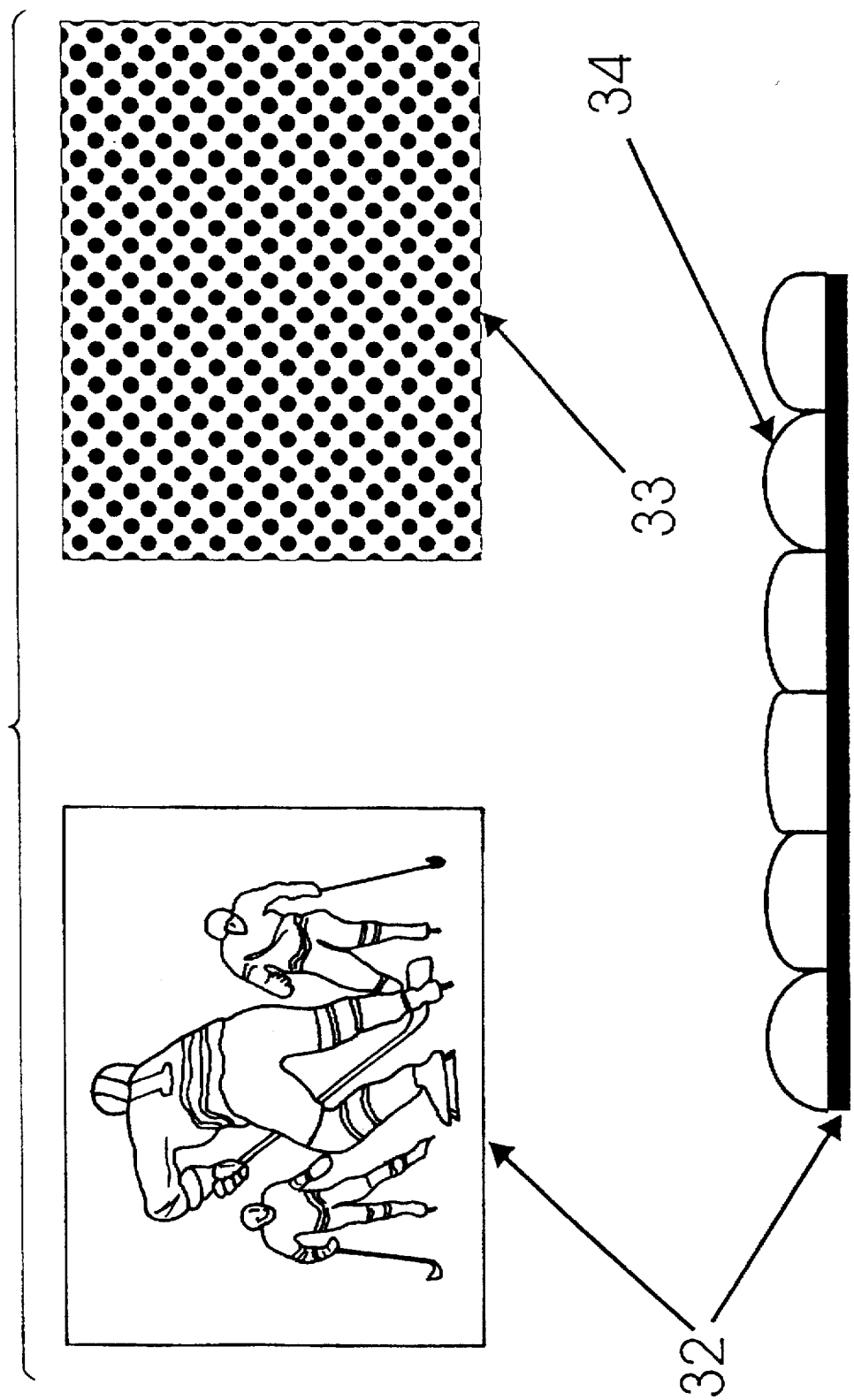
FIG. 10 illustrates the application of the pixel-level depth display techniques derived in the course of these developments to the 3-dimensional display of printed images.

FIG. 10 illustrates the application of the pixel-level depth display techniques derived in the course of these developments to the 3-dimensional display of printed images. Scene 32 is a conventional 2-dimensional photograph or printed scene. A matrix 33 of pixel-level microlenses (shown here exaggerated for clarity) is applied over the 2-D image such that each minute lens has a different focal length, and therefore presents that pixel at a different apparent depth to the viewer's eye. Viewed greatly magnified in cross section 34, each microlens may be seen to be specific in shape, and therefore optical characteristics, so as to provide the appropriate perception of depth to the viewer from its particular image pixel. While microlenses with diameters as small as 1 mm have been utilized in our laboratories to date, experiments have been conducted with fractional mm microlenses which conclude that arrays of lenses of this size are entirely feasible, and that they will result in 3-D printed imagery with excellent resolution.

In mass production, it is anticipated that the depth signal generating techniques described herein will be employed to produce an imprinting master, from which high volume, low cost microlens arrays for a given image might be, once again, embossed into impressionable or thermoplastic plastic materials in a fashion analogous to the embossing of the data-carrying surfaces of compact discs or the mass-replicated reflection holograms typically applied to credit cards. Such techniques hold the promise of large-scale, low cost 3-D printed imagery for inclusion in magazines, newspapers and other printed media.

It is important to note that the picture, or luminance, carrier in the conventional NTSC video signal occupies significantly greater video bandwidth than either of the chrominance or depth sub-carriers. The luminance component of an NTSC video picture is of relatively high definition, and is often characterized as a picture drawn with "a fine pencil". The chrominance signal, on the other hand, is required to carry significantly less information to produce acceptable colour content in a television picture, and is often characterized as a "broad brush" painting a "splash" of colour across a high definition black-and-white picture. The depth signal in the present invention is in style more similar to the colour signal in its limited information content requirements than it is to the high definition picture carrier.

One of the critical issues in video signal management is that of how to encode information into the signal which was not present when the original was constructed, and to do so without confusing or otherwise obsoleting the installed base of television receivers. FIG. 11 illustrates the energy distribution of the conventional NTSC video signal, showing the picture, or luminance, carrier 36, and the chrominance, or colour information, carrier 37. All of the information in the video spectrum is carrier by energy at separated frequency intervals, here represented by separate vertical lines; the remainder of the spectrum is empty and unused. As may be seen from FIG. 11, the architects of the colour NTSC video signal successfully embedded a significant amount of additional information (i.e. the colour) into an established signal construct by utilizing the same concept of concentrating the signal energy at separated frequency points, and then interleaving these points between the established energy frequency points of the picture carrier such that the two do not overlap and interfere with each other.

In a similar fashion, the present invention encodes still further additional information, in the form of the required depth signal, into the existing NTSC video signal construct, utilizing the same interleaving process as is employed with the chrominance signal. FIG. 12 illustrates this process by showing, once again, the same luminance carrier 36 and chrominance sub-carrier 37 as in FIG. 11, with the addition of the depth sub-carrier 38. For reference purposes, the chrominance sub-carrier occupies approximately 1.5 MHz of bandwidth, centred on 3.579 MHz, while the depth sub-carrier occupies only approximately 0.4 MHz, centred on 2.379 MHz. Thus, the chrominance and depth sub-carriers, each interleaved with the luminance carrier, are sufficiently separated so as not to interfere with each other. Other sub-carrier frequencies and occupied bandwidths are possible, but the stated ones have proven to be quite workable. As well, similar approaches to embedding the depth signal into the PAL and SECAM video formats have been tested in the laboratory, although the specifics of construct and the relevant frequencies vary due to the differing nature of those video signal constructs.

FIG. 13(a) illustrates in functional form the circuitry within a conventional television receiver which typically controls the vertical deflection of the scanning electron beam in the cathode-ray tube, using terminology common to the television industry. While some of the details may vary from brand to brand and from model to model, the essentials remain the same.

In this diagram representing the conventional design of a television receiver, the object is to generate a sweep of the scanning electron beam which is consistent and synchronized with the incoming video signal. Signal is obtained by Tuner 49 and amplified by Video IF amp 50, then sent to Video detector 51 to extract the video signal. The output of the video detector 51 is amplified in Detector Out Amp 52, further amplified in the First Video Amplifier 53, and passed through a Delay Line 54.

Within a conventional video signal, there are 3 major components: the luminance (that is, the brightness, or "black-and-white" part of the signal); the chrominance (or colour part); and the timing part of the signal, concerned with ensuring that everything happens according to the correctly choreographed plan. Of these components, the synchronization information is separated from the amplified signal in the Synchronization Separator 55, and the vertical synchronization information is then inverted in Vertical Sync Invertor 56 and fed to the Vertical Sweep generator 64. The output of this sweep generator is fed to the ectromagnetic coil in the cathode-ray tube known as the Deflection Yoke, 65. It is this Deflection Yoke that causes the scanning electron beam to follow a smooth and straight path as it crosses the screen of the cathode-ray tube.

A s described earlier, in a 3-D television tube, minute variations in this straight electron beam path are introduced which, through the pixel-level optics, create the 3-D effect. FIG. 13(b) illustrates in the same functional form the additional circuitry which must be added to a conventional television to extract the depth component from a suitably encoded video signal and translate that depth component of the signal into the minutely varied path of the scanning electron beam. In this diagram, the functions outside the dashed line are those of a conventional television receiver as illustrated in FIG. 13(a), and those inside that dashed line represent additions required to extract the depth component and generate the 3-D effect.

As described in FIG. 12, the depth signal is encoded into the NTSC video signal in a fashion essentially identical to that of the encoding of the chrominance, or colour signal, but simply at a different frequency. Because the encoding process is the same, the signal containing the depth component may be amplified to a level sufficient for extraction using the same amplifier as is used in a conventional television set for amplifying the colour signal before extraction, here designated as First Colour IF amplifier 57.

This amplified depth component of the signal is extracted from the video signal in a process identical to that used for extracting the encoded colour in the same signal. In this process, a reference, or "yardstick" signal is generated by the television receiver at the frequency at which the depth component should be. This signal is compared against the signal which is actually present at that frequency, and any differences from the "yardstick" are interpreted to be depth signal. This reference signal is generated by Depth Gate Pulse Former 59, and shaped to its required level by Depth Gate Pulse Limiter 58. The fully formed reference signal is synchronized to the incoming encoded depth signal for the same Synchronization Separator 55 used to synchronize the horizontal sweep of the electron beam in a conventional television receiver.

When the amplified encoded depth signal from First Colour IF Amplifier 57 and the reference signal from Depth Gate Pulse Limiter 58 are merged for comparison, the results are amplified by Gated Depth Synchronization Amplifier 63. This amplified signal will contain both colour and depth components, so only those signals surrounding 2.379 Mhz, the encoding frequency of the depth signal, are extracted by extractor 62. This, then, is the extracted depth signal, which is then amplified to a useful level by X"TAL Out Amplifier 61.

Having extracted the depth component from the composite video signal, the circuitry must now modify the smooth horizontal sweep of the electron beam across the television screen to enable the display of depth in the resulting image. In order to modify this horizontal sweep, the extracted and amplified depth signal is added in Depth Adder 60 to the standard vertical synchronization signal routinely generated in a conventional television set, as described earlier in FIG. 13(a). The modified vertical synchronization signal which is output from Depth Adder 60 is now used to produce the vertical sweep of the electron beam in Vertical Sweep Generator 64, which, as in a conventional receiver, drives the Deflection Yoke 65 which controls the movement of the scanning electron beam. The end result is a scanning electron beam which is deflected minutely up or down from its conventional centreline to generate a 3-D effect in the video image by minutely varying the input point of light to the pixel-level optics described earlier.

FIG. 14 illustrates electronic circuitry which is a preferred embodiment of those additional functions described within the dashed line box in FIG. 13.

FIG. 15 illustrates an alternative means of varying the position of the light which is input to a different form of pixel level optical structure. In this alternative, pixel level optical structure 39 has an appropriate optical transfer function, which provides a focal length which increases radially outwardly from the axis of the optical element 39 and is symmetrical about its axis 43. Light collimated to cylindrical form is input to the optical structure, and the radius of the collimated light cylinder may vary from zero to the effective operating radius of the optical structure. Three such possible cylindrical collimations 40, 41 and 42 are illustrated, producing from a frontal view the annular input light bands 40a, 41a and 42a respectively, each of which will produce, according to the specific optical transfer function of the device, a generated pixel of light at a different apparent distance from the viewer.

I claim:

1. A 2-dimensional display device on which an image formed by discrete pixels is presented, the display device having means for dynamically varying across the image, pixel by pixel, the apparent visual distance from a viewer, positioned in front of the display device, at which each individual pixel appears, whereby a 3-dimensional image is created; wherein the means for dynamically varying comprises an array of transparent optical refractory elements aligned respectively in front of the pixels and each having a focal length which varies progressively along refractory surfaces oriented generally parallel to the image, and means for displacing minutely within a pixel the location at which light is emitted according to a desired depth such that there is a corresponding displacement of an input location of the light along an input refractory surface of the optical element whereby the apparent visual distance from the viewer varies according to the displacement of the input location of light.

2. A display device as claimed in claim 1 in which the display device includes one of a liquid crystal display device, electroluminescence device and plasma display device as a light source.

3. A display device as claimed in claim 1 in which each optical refracting element has a focal length which varies radially with respect to an optical axis of the optical refractory element, and the displacing means displaces radially within a pixel the location at which light is emitted.

4. A display device as claimed in claim 3 in which the display device includes one of a liquid crystal display device, electroluminescence device and plasma display device as a light source.

5. A display device as claimed in claim 1 in which each optical refractory element is elongate and has a focal length which varies along its length from one end, and the display means displaces linearly within a pixel the point at which light is emitted.

6. A display device as claimed in claim 5 in which the display device includes one of a liquid crystal display device, electroluminescence device and plasma display device as a light source.

7. A display device as claimed in claim 6 in which the display device includes a cathode ray tube having thereon a plurality of elongate phosphor pixels and in which the means for displacing minutely within a pixel the location at which light is emitted comprises means for displacing the electron beam along each phosphor pixel.

8. A display device as claimed in claim 7 in which the display device is a television receiver having means for extracting a depth component for each pixel from a received signal and means for adding the depth component to the conventional horizontal scan line to control the vertical level of the horizontal scan line pixel by pixel whereby a stepped raster scan line is obtained.

9. A display device as claimed in claim 1 in which a minute interstitial gap is provided between the individual optical elements.

10. A display device as claimed in claim 9 in which a black opaque material fills the interstitial gap.

11. A display device as claimed in claim 1 in which the transparent optical elements are provided as an embossed sheet of plastics material.

12. A display device as claimed in claim 1 in which each optical element is a compound device comprising at least two individual optical components.

13. A display device as claimed in claim 12 in which the at least two individual optical components are provided as at least two embossed sheets of plastics material which are cemented together.

14. A display device as claimed in claim 5 in which the display device is a viewer or projector for a photographic film transparency and the means for displacing the point at which light is emitted comprises a mask applied to each pixel of the transparency such that a preselected transparent point is provided.

15. A 2-dimensional display device comprising a cathode ray tube having thereon a plurality of rectangular phosphor pixels each having a length and a width and including means for displacing an electron beam along the length of each phosphor pixel according to a desired depth, and an array of rectangular transparent optical refractory elements aligned respectively in front of the pixels and each having a length and a width, each optical element having a focal length which varies progressively along the length of the optical element, whereby the apparent visual distance from a viewer, positioned in front of the display device, at which each individual pixel appears varies according to the desired depth thereby creating a 3-dimensional image.

16. A display device as claimed in claim 15 in which the pixels are aligned in rows.

17. A display device as claimed in claim 16 in which the display device is a television receiver having means for extracting a depth component for each pixel from a received signal and means for adding the depth component to the conventional horizontal scan line to control the vertical level of the horizontal scan line pixel by pixel whereby a stepped raster scan line is obtained.

* * * * *